United States Patent
Hadjiev et al.

(10) Patent No.: US 7,892,439 B2
(45) Date of Patent: Feb. 22, 2011

(54) METHOD FOR CHEMICALLY TREATING A LIQUID MEDIUM LOADED WITH NITRATES, DEVICE FOR TREATING A LIQUID MEDIUM OF THIS TYPE AND APPLICATIONS

(75) Inventors: Dimiter Hadjiev, Lorient (FR); Lionel Limousy, Hennebont (FR); Thomas Lendormi, Plumeliau (FR)

(73) Assignees: Societe Cooperative Agricole Des Perrinots, Marmande (FR); Pierre Magnes, Villenouvelle (FR); Michel Reynes, Castelginest (FR)

( * ) Notice: Subject to any disclaimer, the term of this patent is extended or adjusted under 35 U.S.C. 154(b) by 877 days.

(21) Appl. No.: 10/574,960

(22) PCT Filed: Oct. 7, 2004

(86) PCT No.: PCT/FR2004/002528
§ 371 (c)(1),
(2), (4) Date: Dec. 22, 2006

(87) PCT Pub. No.: WO2005/035451
PCT Pub. Date: Apr. 21, 2005

(65) Prior Publication Data
US 2007/0108134 A1 May 17, 2007

(30) Foreign Application Priority Data
Oct. 8, 2003 (FR) .................................. 03 11789

(51) Int. Cl.
*C02F 1/32* (2006.01)

(52) U.S. Cl. ...................... 210/748.1; 210/638; 210/749
(58) Field of Classification Search ................. 210/748, 210/600, 749, 638, 748.01
See application file for complete search history.

(56) References Cited

U.S. PATENT DOCUMENTS

| | | | |
|---|---|---|---|
| 4,283,290 A * | 8/1981 | Davies | 210/643 |
| 5,093,099 A * | 3/1992 | Haishi et al. | 423/622 |
| 5,266,174 A | 11/1993 | Mattus | |
| 5,951,869 A * | 9/1999 | Heskett | 210/638 |
| 6,030,520 A | 2/2000 | Dziewinski et al. | |
| 2005/0183964 A1 * | 8/2005 | Roberts et al. | 205/701 |

OTHER PUBLICATIONS

Chin-Pao Huang et al. "Nitrate Reduction by Metallic Iron." *Wat. Res.* vol. 32, No. 8, pp. 2257-2264, 1998. Elsevier Science Ltd. Printed in Great Britain.

\* cited by examiner

*Primary Examiner*—Walter D Griffin
*Assistant Examiner*—Cameron J Allen
(74) *Attorney, Agent, or Firm*—Leydig, Voit & Mayer, Ltd.

(57) ABSTRACT

The invention relates to a method for chemically treating a liquid medium loaded with nitrates, primarily comprising a step in which zinc is brought into contact with said liquid medium whose pH is preferably less than 4. When this contacting step leads to the presence of residual zinc in the liquid medium, the liquid medium is circulated through at least one electrolytic cell. The invention also relates to a device for treating a liquid medium loaded with nitrates, to applications of this method, and to a device for reducing the proportion of nitrates in ground water.

41 Claims, 17 Drawing Sheets

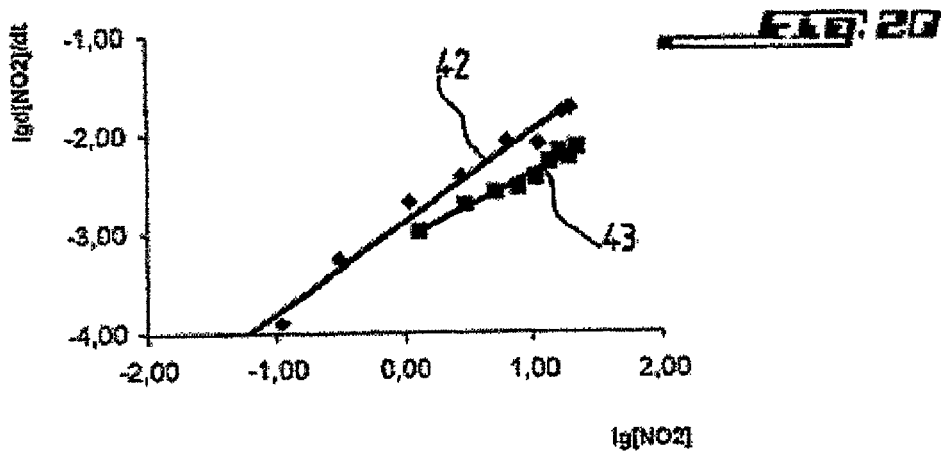
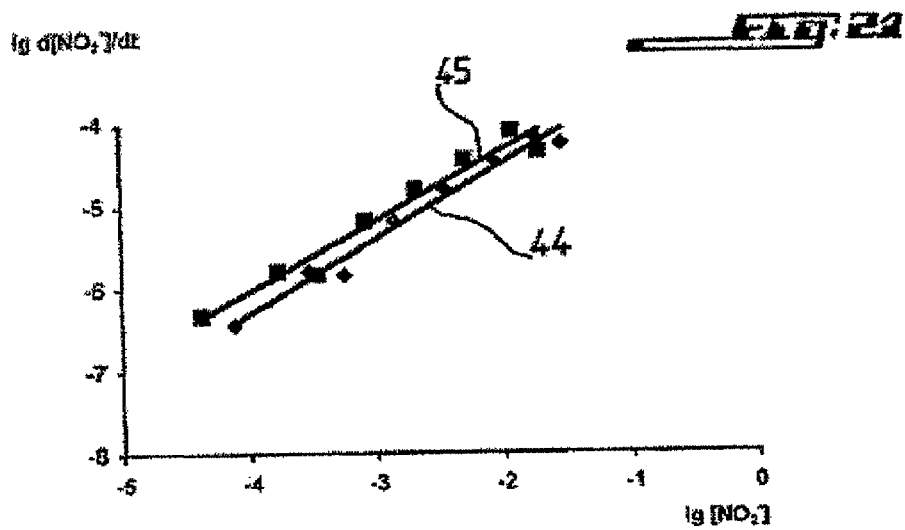
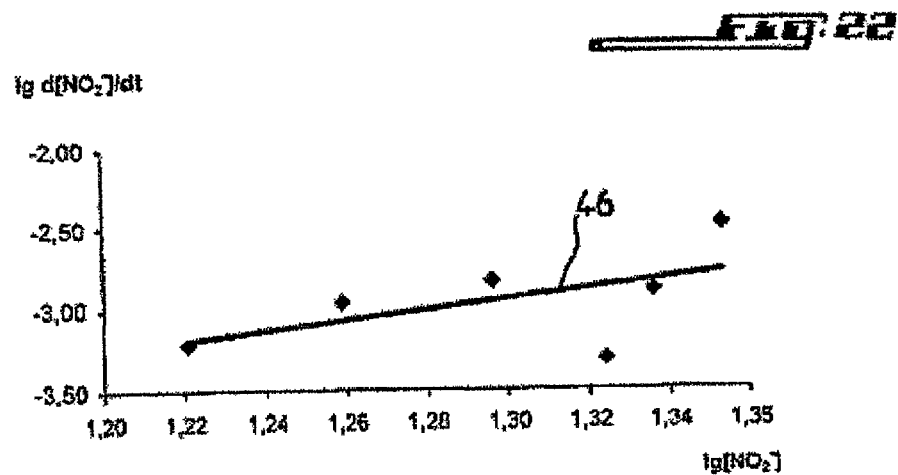

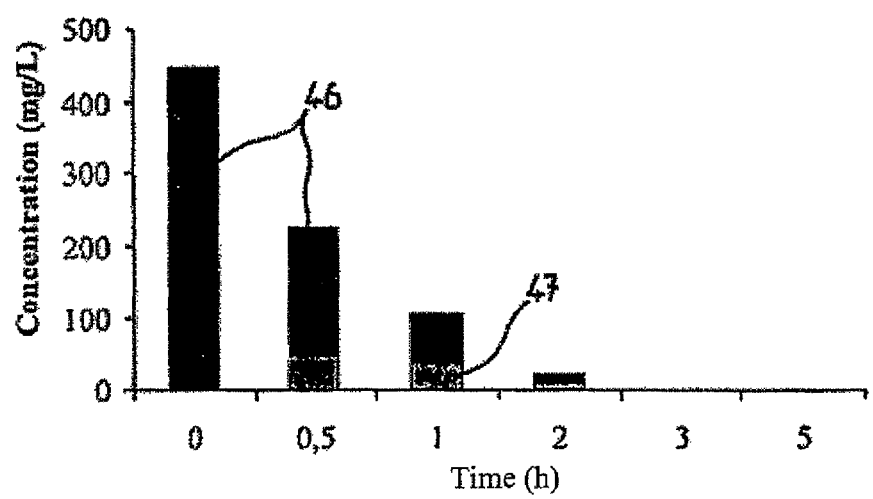
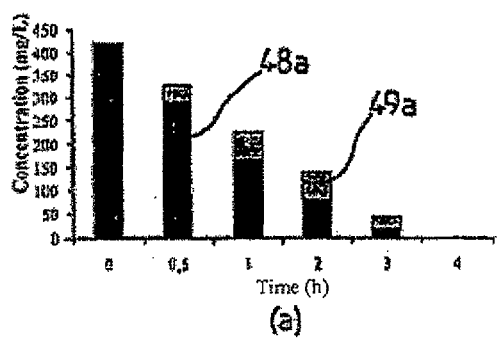
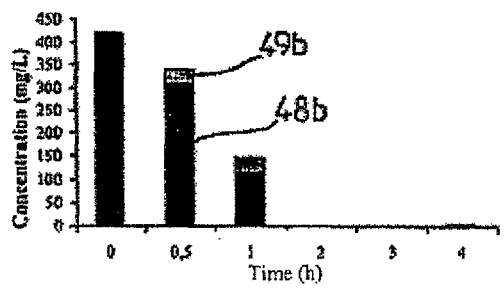

METHOD FOR CHEMICALLY TREATING A LIQUID MEDIUM LOADED WITH NITRATES, DEVICE FOR TREATING A LIQUID MEDIUM OF THIS TYPE AND APPLICATIONS

The present invention relates to a method for chemically treating a liquid medium loaded with nitrates.

The invention also relates to a device for processing such a liquid medium and to the applications of this method.

The liquid effluents resulting from the drainage of cultivation soils are subject to regulation whose goal is to reduce the quantity of pollutants contained in these effluents.

These pollutants include more particularly nitrates.

In the context of the cultivation of tomatoes outside the ground, in a greenhouse, for example, the liquid effluents originating from the drainage waters can contain a concentration of nitrates up to 3 g/L for a maximum flow rate of 31 m$^3$/day/hectare.

However, the disposal of these waters is harmful to the environment, and in the past, the maximum nitrate concentration acceptable for the environment was estimated to be 50 mg/L, and, currently, it is estimated to be 25 mg/L.

Biological treatment of these effluents is possible, but it presents two major disadvantages, namely the presence of organic compounds that are not easily biodegradable in the effluents, thus requiring a significant addition of methanol, as well as the presence of microorganisms, which is not desirable in proximity to the site of the cultivation.

In this context, the invention concerns a method for treating a liquid medium which is charged with nitrates to reduce the concentration of nitrates without the formation of other pollutant species, which can be harmful to the environment. The invention also consists of a device making it possible to treat a liquid medium loaded with nitrates and of possible applications of the method of the invention.

To this effect, the method of the invention comprises at least one step of contacting zinc and said liquid medium, whose pH is less than 4.

In the method of the invention, it is provided for the pH of said liquid medium to be maintained constant by a regular adjustment consisting of adding an appropriate quantity of acid to the liquid medium.

The acid used is preferably hydrochloric acid.

In this case, the adjustment of the pH can be carried out at least every half hour for the duration of the treatment.

In addition, the temperature of the liquid medium during the contacting step can be higher than 20° C., but it can also be approximately 20° C.

According to a first aspect of the method of the invention, the zinc is in powder form.

In this case, the weight ratio between the zinc and the nitrates in solution is preferably at least 5.

It is preferred for the liquid medium to be subjected to stirring. In this case, the stirring can be carried out by pulses or static mixers.

The liquid medium advantageously is subjected to stirring at a speed of at least 0.55 m/s.

The method of the invention makes it possible to treat a liquid medium whose initial concentration of nitrates is greater than 25 mg/L and also greater than 50 mg/L.

According to a second aspect of the method of the invention, the zinc is in the form of chips.

In this case, it is preferred for the zinc chips to be degreased and rinsed with distilled water.

Also, in this case, it is advantageous for the contact surface between the zinc and the liquid medium to be at least 0.0156 m$^2$/L and, more advantageously, approximately 0.25 m$^2$/L.

In the method of the invention, the liquid medium can consist of drainage waters in which the concentration of nitrates can be greater than 1 g/L.

Advantageously, the circulation flow rate of the liquid medium in contact with the zinc is greater than 0.005 m/s and, preferably, approximately 0.01 m/s.

According to the invention, the method can comprise, in addition, a step of electrolysis of the liquid medium.

This electrolysis step can consist in circulating the liquid 68 in at least one electrolysis cell 110a, 110b, 110c, 110d, 110e, 110f in which a current circulates between two electrodes, an anodic electrode 109a, 109b, 109c, 109d and a cathodic electrode 108a, 108b, 108c, respectively.

It is preferred for each cathodic electrode 108a, 108b, 108c to be made by the compression of carbon particles between two perforated plates 116b, 116b' in which at least one electrode forming means 117 is inserted while being connected to the negative pole of a generator.

It is highly preferred for the anodic electrode 109a, 109b, 109c, 109d to be made by the compression of zinc chips between two perforated plates 118a, 118a', 118b, 118b' in which at least one electrode forming means 119b, 119c is inserted while being connected to the positive pole of a generator.

In addition, it is preferred for the liquid medium 68 to circulate in at least six electrolysis cells 110a, 110b, 110c, 110d, 110e, 110f.

Advantageously, the pH of the liquid mixture is maintained above 5 and preferably equal to 10 for the entire duration of the electrolysis step.

The potential which is applied between the anodic electrode 109a, 109b, 109c and the cathodic electrode 108a, 108b, 108c is preferably approximately 2 volts for a current of 1.5-1.8 ampere per liter of solution treated.

The invention also concerns a device for chemically treating a liquid medium loaded with nitrates, which device comprises at least one nitrate reduction enclosure 56, comprising a liquid inlet 57, at least one zinc layer 70, 85, 85b, 85c, 99a, 99b, 99c, 99d, 99e, 99f, 99g, a means for the circulation of said liquid medium 59 through said zinc layer, and an outlet for the liquid medium 58 from the enclosure 56.

Advantageously, the nitrate reduction enclosure 56 is arranged vertically and it comprises at least one zinc layer 70, 85a, 85h, 85c, 99a, 99b, 99c, 99d, 99e, 99f, 99g that is arranged transversely over the entire width of the enclosure 56 and that is produced by the compression of zinc chips between two perforated plates 71, 72, 86a 86a', 86b, 86b', 86c, 86c', the liquid inlet 57 is arranged in the lower part of the enclosure 56, the liquid outlet 58 is arranged in the upper part of the enclosure 56, and the device comprises, in addition, a recirculation pump 59 making it possible to ensure the circulation and the recirculation of the liquid from the inlet 57 to the outlet 58 passing through all the zinc layers 70, 85a, 85b, 85c, 99a, 99b, 99c, 99d, 99e, 99f, 99g.

It is preferred for the height of each zinc layer 70, 85a, 85b, 85c, 99a, 99b, 99c, 99d, 99e, 99f, 99g to be less than 10 cm.

In addition, the enclosure 56 can comprise a system for stirring the liquid 75, which makes it possible to stir the liquid circulating in the enclosure 56 above each zinc layer 70, 85a, 85b, 85c, 99a, 99b, 99c, 99d, 99e, 99f, 99g, by forming a corresponding stirring zone 78, 92a, 92b, 92c, 99a1, 99b1, 99c1, 99d1, 99e1, 99f1, 99g1.

It is preferred for the stirring speed of the liquid in each stirring zone 78, 92a, 92b, 92c, 99a1, 99b1, 99c1, 99d1, 99e1, 99f1, 99g1 be approximately 0.85 m/s.

Advantageously, at least one stirring zone out of two is connected to a pH regulator.

In this case, the pH regulator can comprise at least one probe 93a, 93b, 93c which measures the pH in the corresponding stirring zone 78, 92a, 92b, 92c, 99a1, 99b1, 99c1, 99d1, 99e1, 99f1, 99g1, a control enclosure 94 and an acid circulation pump 95.

It is preferred for the pH of the liquid medium to be maintained at a value below 6 by the pH regulator and highly preferably at a value between 2 and 3.

Also, the circulation speed of the liquid in the enclosure 56 is preferably approximately 0.01 m/s.

Finally, the enclosure 56 comprises advantageously at least three zinc layers 70, 85a, 85b, 85c, 99a, 99b, 99c, 99d, 99e, 99f, 99g.

The device of the invention can comprise, in addition, a zinc reduction enclosure 106, in which the liquid 68 circulates at the outlet of the nitrate reduction enclosure 56.

In this case, the zinc reduction enclosure 106 comprises at least one electrolysis cell 110a, 110b, 110c, 110d, 110e, 110f.

It is preferred for each cathodic electrode 108a, 108b, 108c of the respective electrolysis cells 110a, 110b, 110c, 110d, 110e, 110f to be produced by the compression of carbon particles between two perforated plates 116b, 116b' and for at least one electrode forming means 117 to be inserted into the carbon particles and connected to the negative pole of a current generator.

It is highly preferred for each anodic electrode 109a, 109b, 109c, 109d of the respective electrolysis cells 110a, 110b, 110c, 110d, 110e, 110f to be produced by the compression of zinc chips between two perforated plates 118a, 118a'; 118b, 118b' and for at least one electrode forming means 119b, 119c to be inserted into the zinc chips and connected to the positive pole of a current generator.

Also, the zinc reduction enclosure 106 can comprise at least three electrolysis cells 110a, 110b, 110c, 110d, 110e, 110f.

It is preferred for the zinc reduction enclosure 106 to be arranged vertically and for the anodic electrodes 109a, 109b, 109c, 109d and the cathodic electrodes 108a, 108b, 108c forming the corresponding electrolysis cells 110a, 110b, 110c, 110d, 110e, 110f to be arranged transversely over the entire width of the enclosure 106 so that all the liquid circulating in the enclosure 106 traverses the electrolysis cells, the liquid inlet 110, 115 to be arranged in the lower part of the enclosure 106, the liquid outlet 115 to be arranged in the upper part of the enclosure 106 and for the device of the invention, in addition, to comprise a recirculation pump 113 making it possible to ensure the circulation and recirculation of the liquid from the inlet 111, 115 to the outlet 112 by traversing all the electrolysis cells 110a, 110b, 110c, 110d, 110e, 110f.

The enclosure 106 can comprise, in addition, a pH regulator that maintains the pH of the liquid medium circulating in the zinc reduction enclosure 106 at a value above 7.

The method and the device of the invention can be used for treating any liquid medium loaded with nitrates and also for treating the waters from the drainage of cultivation.

The invention will be understood better, and other purposes, advantages and characteristics of the latter will become clearer following a reading of the following description that is made with reference to the drawing in the appendix, in which:

FIG. 20 represents the change of log $d([NO_2^-]/dt)$ as a function of log $(NO^{2-})$ according to the pH of the liquid medium;

FIG. 21 represents the change of log d([NO$_2^-$]/dt) as a function of log (NO$^{2-}$) according to the pH of the liquid medium;

FIG. 22 represents the change of log d([NO$_2^-$]/dt) as a function of log (NO$^{2-}$) at pH 4;

FIG. 23 represents the history of the concentrations of nitrates and of nitrites as a function of the duration of the treatment when the liquid medium consists of drainage waters;

FIGS. 24a and 24b represent the change in the concentrations of nitrates and of nitrites as a function of the duration of the treatment when the liquid medium consists of drainage waters according to the temperature of the reaction medium and when the pH is adjusted every half hour;

The experimental conditions of the results presented in FIGS. 1-4 correspond to the use of an aqueous solution having a volume of 250 mL containing nitrates in which 10 grams of zinc in powder form have been added.

The initial pH of the solution of nitrates is 3.60, where this pH is obtained by the addition of an appropriate quantity of hydrochloric acid to the solution.

In addition, this solution is subjected for the entire duration of the treatment to a continuous stirring produced by a magnetic stirrer.

Figure 1:
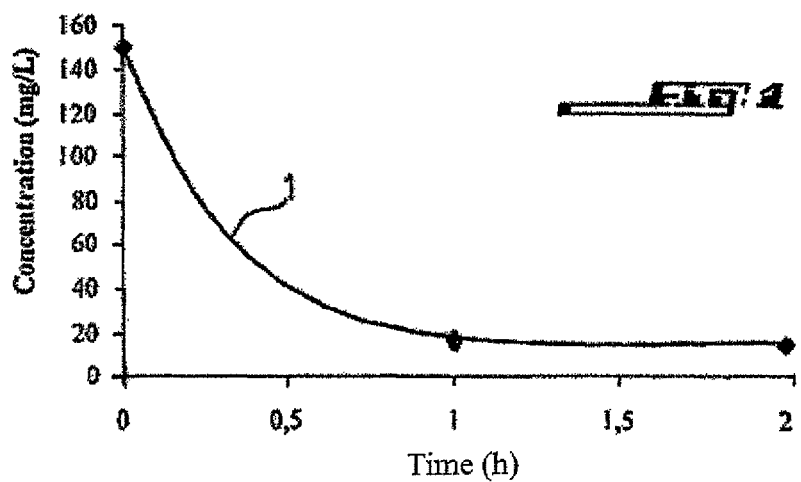
FIG. 1 represents the history of the concentrations of nitrates in the liquid medium as a function of the treatment time, when zinc powder is used.

With reference to FIG. 1, curve 1 representing the history of the concentration of nitrates in a solution maintained at a temperature of 80° C., decreases from an initial concentration of nitrates of 150 mg/L to approximately 15 mg/L after 2 h of treatment, which corresponds to a conversion rate of 90%.

The results presented in FIG. 1 show that nitrates can be reduced by zinc in solution.

Figure 2:
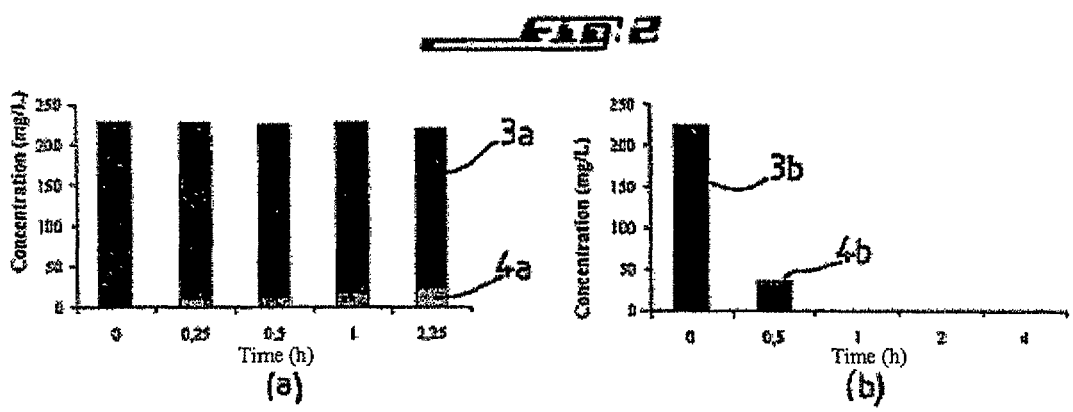
FIGS. 2a and 2b represent the history of the nitrogen concentrations corresponding with a factor to the concentrations of nitrates and nitrites in the liquid medium as a function of the duration of the treatment with and without pH adjustment.
Figure 3:
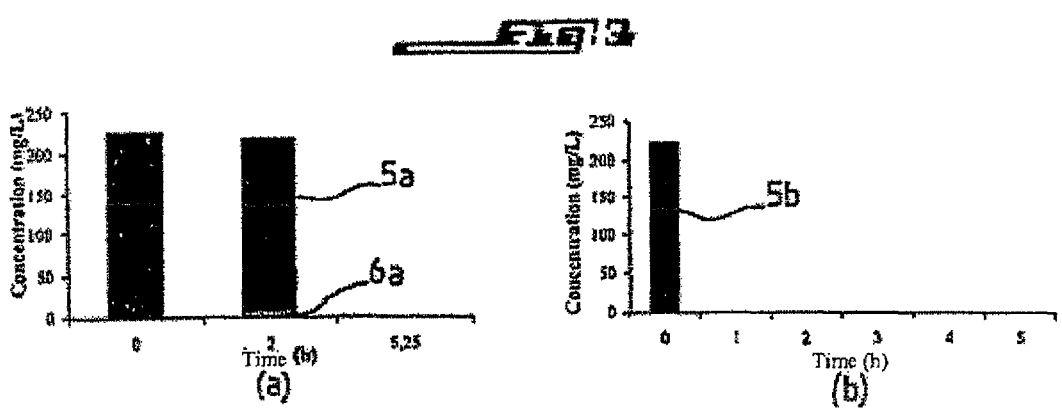
FIGS. 3a and 3b represent the history of the nitrogen concentrations corresponding with a factor to the concentrations of nitrates and nitrites in the liquid medium as a function of the duration of the treatment depending on the frequency of adjustment of the pH.
Figure 4:
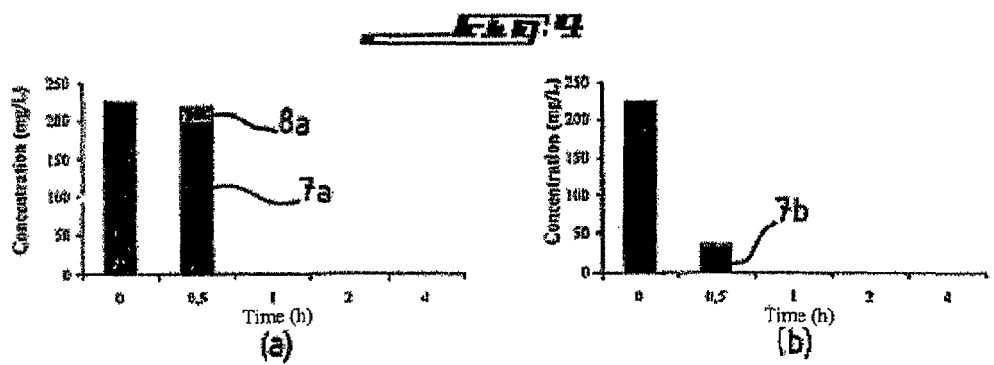
FIGS. 4a and 4b show the history of the nitrogen concentrations corresponding with a factor to the concentrations of nitrates and nitrites in the liquid medium as a function of the duration of the treatment according to the temperature of the reaction medium.

The results of a parametric study, which makes it possible to detect the parameters that influence the elimination of nitrates by zinc, to optimize the treatment conditions, are presented in FIGS. 2-4.

To this effect, FIGS. 2-4 present the history of nitrogen concentrations corresponding with a factor to the concentrations of nitrates and of nitrites, respectively, in the form of histograms.

More specifically, the concentrations of nitrates are obtained by multiplying the nitrogen concentration by four and the concentrations of nitrites are obtained by multiplying the nitrogen concentration by three.

To this effect, FIGS. 2a and 2b present the history of nitrogen concentrations when the solution is maintained at a temperature of 80° C. and in said figures the black bars 3a 3b correspond to the concentration of nitrates, and the gray bars 4a, 4b correspond to the concentration of nitrites.

With reference to FIG. 2a, a small reduction of the concentration of nitrates appears, as well as a small increase in the concentration of nitrites for a treatment duration of 2.25 hours.

In the case of FIG. 2b, the pH was maintained at a value under 6 by the addition of hydrochloric acid to the solution during the treatment. A very clear difference in effectiveness appears in terms of reduction of the nitrates between the results presented in FIG. 2a and those in FIG. 2b since, in the last case, the concentration of nitrates is less than 200 mg/mL after 30 minutes of treatment and it is zero after one hour of treatment.

With reference to FIG. 3a, the effectiveness of the treatment in terms of reduction of nitrates in solution is illustrated by the black bars 5a, when the pH of the solution is maintained at a pH of less than 6 by an adjustment carried out once every hour during the treatment and at a temperature of the reaction medium of 20° C.

In contrast, with reference to FIG. 3b, when this pH adjustment is carried out every half hour during the treatment, the concentration of nitrates, which is represented by the black bar, is zero after one hour of treatment.

Thus, it is possible to obtain a total reduction of the nitrates within a short time period by working at ambient temperature, if a pH adjustment allowing the maintenance of the solution at a pH of less than 6 is carried out regularly during the treatment at least every half hour.

FIGS. 4a and 4b correspond to the history of the concentrations of nitrates, which are illustrated by the black bars 7a, 7b, and of nitrites, which are illustrated by the gray bar 8a, when the pH of the solution is maintained at a value below 6 during the treatment and for different temperatures of the reaction medium. The results of FIG. 4a correspond to a temperature of the solution of 50° C. and those of FIG. 4b, c to a temperature of the solution of 80° C.

It is evident that the rate of disappearance of the nitrates is greater at the temperature of 80° C. than the rate of disappearance of the nitrates when this temperature is maintained at 50° C.

Indeed, after 30 minutes of treatment, the concentration of nitrates is less than 200 mg/L when the temperature of the medium is 80° C., whereas, for a temperature of 50° C. the concentration of nitrates is nearly identical to the initial concentration of nitrates of approximately 920 mg/L after half an hour of treatment.

The results presented in FIGS. 2, 3 and 4 demonstrate that the adjustment of the pH and, more generally, the acidity of the reaction medium is a first parameter to be taken into consideration in the method of the invention and that the temperature of the reaction medium is also a parameter that influences the effectiveness of the treatment.

The results also show that it is possible to obtain a satisfactory reduction of the nitrates in solution at ambient temperature provided that a regular pH adjustment is carried out.

Finally, these results show particularly that the addition of zinc in a liquid medium loaded with nitrates achieves the total elimination of the nitrates, possibly in less than one hour of treatment starting from a concentration of nitrates of more than 800 mg/L.

In addition, an assay by atomic absorption has shown that, under the conditions described previously, the concentration of zinc in the solution after treatment remains less than 5 mg/L.

It is possible to express the reactions involved in the treatment by equations, which include the functioning of the nitrates and of the zinc, where the latter functions as a reducing agent, as follows:

$$NO_3^- + Zn + 3H^+ \rightarrow HNO_2 + Zn^{2+} + H_2O$$

$$2HNO_2 + 2Zn + 4H^+ \rightarrow N_2O + 2Zn^{2+} + 3H_2O$$

$$2NO_2^- + 3Zn + 8H^+ \rightarrow N_2 + 4H_2O + 3Zn^{2+}$$

$$NO_2^- + 3Zn + 8H^+ \rightarrow NH_4^+ + 2H_2O + 3Zn^{2+}$$

According to the experimental results presented in FIGS. 1-4, the redox reaction involving the nitrates and the zinc in an acidic medium results in the formation of nitrous acid and thus of nitrites in solution.

The above-mentioned redox reactions consume protons, which is in conformity with the above described results and demonstrates the need to maintain an acidic pH to ensure the total reduction of the nitrate ions in solution within a satisfactory time period.

Thus, two steps can be considered, namely a first step consisting in converting the nitrates into nitrites, and the second step which consists in converting the nitrites into nitrogen protoxide.

Consequently, the reduction of the nitrites by zinc was studied to understand and to optimize the reaction of reduction of the nitrates in its totality, particularly in view of the fact that preliminary tests have shown a considerable difference between the rates of reduction of nitrates and of nitrites, where the rate of reduction of nitrates is much greater than that of nitrites.

The method used to assay the nitrites in solution during the treatment is a colorimetric assay by molecular absorption spectrophotometry.

This method is standardized and its principle resides in the diazotation of amino-4-benzenesulfonamide by nitrites in an acidic medium and its coupling with N-(1-naphthyl)-1,2-diaminoethane dichloride that leads a purple colored complex, which can be assayed by spectrometry.

The equilibrium between the nitrites and the nitrates can change rapidly and, therefore, it is necessary to carry out the assay of the nitrites as soon as possible after sampling, using a storage temperature of 4° C.

As far as the protocol is concerned, the readings are taken at the wavelength of 543 nm, and the following reagents are used:

| | |
|---|---|
| Orthophosphoric acid (d = 1.70) | 100 mL |
| Diazotation reagents: | |
| 4-Aminobenzenesulfonamide | 40 g |
| N-(1-naphthyl)-1,2-diaminoethane dichloride | 2 g |
| Orthophosphoric acid | 100 mL |
| Exchanged water q.s.p. | 1000 mL |
| Stock calibration solution of nitrous nitrogen ($NO_2$) at 300 mg/L | |
| Sodium nitrite | 492.8 mg |
| Exchanged water q.s.p. | 1000 mL |
| Daughter standard solution of nitrous nitrogen ($NO_2$) at 1 mg/L | |
| Dilution 1/100 stock solution | |

The composition of the vials with a volume of 50 mL, which are used for the calibration curves, is presented in the following Table 1:

TABLE 1

| | Number of the vials | | | | | | |
|---|---|---|---|---|---|---|---|
| | T | I | II | III | IV | V | VI |
| Daughter standard solution at 1 mg/L (mL) | 0 | 1 | 2.5 | 5 | 7.5 | 10 | 15 |
| Exchanged water (mL) | 50 | 49 | 47.5 | 45 | 42.5 | 40 | 35 |
| [N—$NO^{2-}$] (mg/L) | 0 | 0.02 | 0.05 | 0.1 | 0.15 | 0.2 | 0.3 |
| [$NO^{2-}$] (mg/L) | 0 | 0.07 | 0.16 | 0.33 | 0.49 | 0.66 | 0.99 |

The following equipment is used:
Spectrometer Cary 50 bio, UV visible
LABMATE pipette with a volume of 1000-5000 L [sic] for manual regulation of the pH and the collection of samples
pH meter Sartorius Professional Meter PP-15
Teflon stirrer Eurostar digital IK (50-2000 rpm)
Scale Sartorius LA 230S
pH regulator CONSORT R305

The measurements of the reduction of the nitrites are carried out using an initial solution having a titer of 1 g/L nitrites and they are carried out using sodium nitrite.

The reduction is carried out in a batch reactor, that is, in a beaker at ambient temperature.

The initial volume of the solution of nitrites is 1 L, and the pH is maintained constant manually throughout the entire reaction by the regular addition of 2M hydrochloric acid.

The stirring of the solution is carried out with a Teflon magnetized bar, and zinc is added to the solution of nitrites in the form of a powder.

The samples having a volume of 4 mL, which are collected at regular intervals, are filtered, and then diluted by [a factor of] 1000 in a 500-mL vial to respect the calibration range ([$NO_2$] from 0 to 1 mg/L).

50 mL are then collected from this last prepared solution and are introduced into a 50-mL beaker, into which 1 mL of the above described reagent is added.

Figure 5:
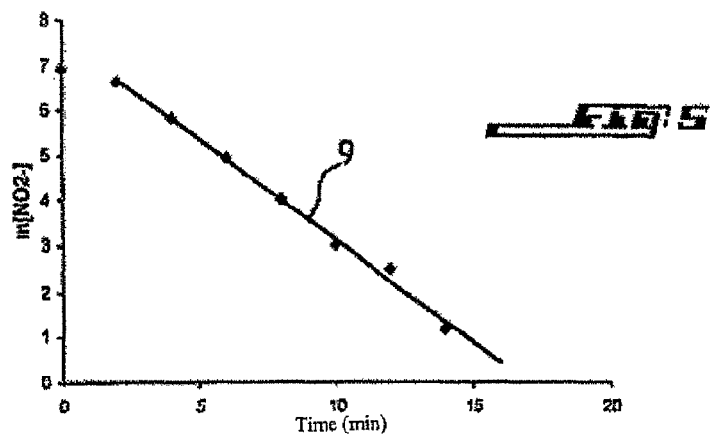
FIG. 5 represents the history of $Ln[NO_2^-]$ as a function of the duration of the treatment.

FIG. 5 presents the linear history, illustrated by the straight line 9, of the neperian logarithm of the concentration of nitrites as a function of the duration of the treatment expressed in minutes, when the pH of the solution is maintained at 5, for a weight of zinc of 10 g.

It is evident that the kinetics of the reduction of the nitrites at [sic; has] a partial order of 1 with respect to the nitrites, where the equation of the line is y=0.4469x+7.5918.

From this line 9, it is possible to calculate K' in the following equation:

$$v(\text{reaction rate}) = k'[NO_{2-}]$$

According to the results illustrated in FIG. 5, k' is equal to $-0.4469 \text{ min}^{-1}$.

Figure 6:
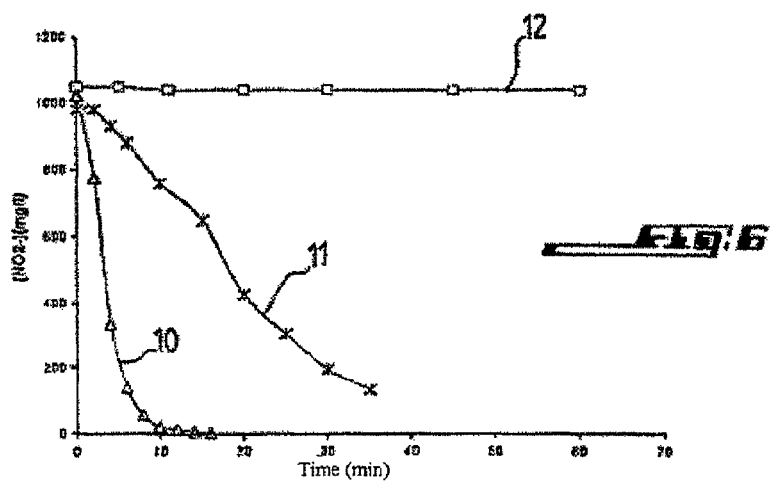
FIG. 6 represents the history of the concentration of nitrites in the liquid medium as a function of the duration of the treatment according to the nature of the metals used.

FIG. 6 presents the history of the concentration of nitrates [sic; nitrites] expressed in mg/L as a function of the duration of the treatment, expressed in minutes, for three metals of different types, which are added to the solution of nitrites in stoichiometric proportions.

Curve 10 represents the history of the concentration of nitrites when 10 g of zinc powder are added to the solution of nitrites; curve 11 represents the history of the concentration of nitrates [sic; nitrites] when 8.54 g of iron powder are added to the solution of nitrites, and, finally, curve 12 illustrates the history of the concentration of nitrites when 4.13 g of aluminum powder are added to the solution.

In the case of aluminum, there is no decrease in the concentration of nitrites during the treatment, and in the case of iron, although the concentration of nitrites decreases, this concentration remains much higher than that obtained when one adds zinc.

These results confirm the unexpected reducing potential of zinc on nitrites, since, with aluminum, no reduction of the nitrates appears after one hour of treatment, in spite of a greater reduction standard potential than that of zinc ($E°(Zn) = -0.763$ V and $E°(Al) = -1.66$ V) whereas for iron, which has an intermediate standard potential ($E°(Fe) = -0.44$ V), a slight reduction of the nitrates appears, which is much less than that obtained with zinc.

Figure 7:
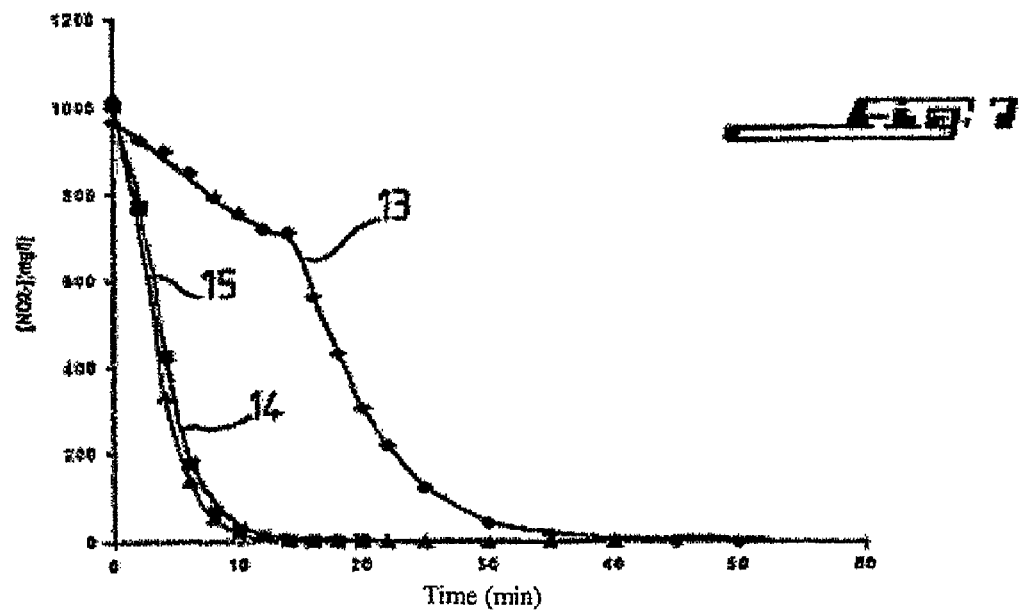
FIG. 7 represents the history of the concentration of nitrites in the liquid medium as a function of the duration of the treatment according to the stirring speed of the liquid medium.
Figure 8:
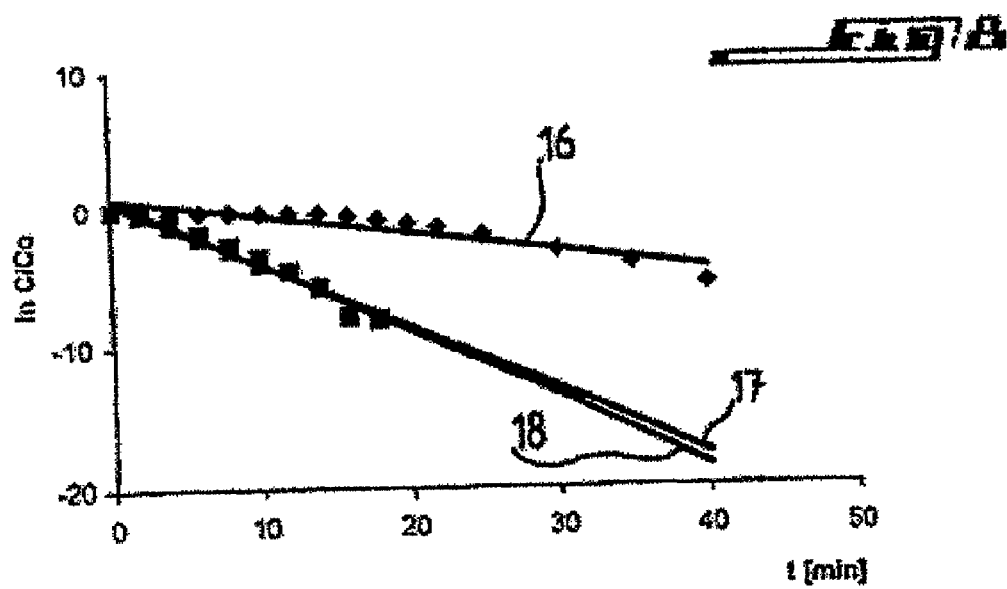
FIG. 8 represents the history of the Ln C/Co of nitrites as a function of the duration of the treatment according to the stirring speed of the liquid medium.

FIGS. 7 and 8 represent the history of the concentration of nitrites and of the neperian logarithm of C/Co of nitrites, respectively, as a function of the duration of the treatment expressed in minutes according to the stirring speed of the treated solution.

Curve 13 of FIG. 7 corresponds to a stirring [speed] of 0.55 m/s, curve 14 corresponds to a stirring [speed] of 0.825 m/s, and curve 15 corresponds to a stirring speed of 1.1 m/s.

One observes that the stirring speed has a considerable influence on the kinetics of reduction, and that a minimum speed of 0.825 m/s is preferable so as not to limit the reaction rate.

Considering that the method of reducing the nitrites comprises three steps, namely the transfer of the nitrites towards the metal surface, the reaction on the surface, and the transfer of the products towards the volume of the liquid, and that the last step can be neglected if one considers that the totality of the nitrites is transformed into nitrogen, the transfer of the nitrites towards the active surface is a purely physical process based on the concentration gradient as the driving force, and the basic equation is the following:

$$\frac{dC}{dt} = KA\Delta C$$

The equation can be integrated easily to obtain the following results:

$$\ln\frac{C}{Co} = KAt$$

The mass transfer coefficient—K will depend on the hydrodynamic conditions and thus notably on the stirring speed of the liquid medium.

The results presented in FIG. 8 are in conformity with the results of FIG. 7, but they are expressed to demonstrate the variation of the mass transfer coefficient, since line 16 of FIG. 8 corresponding to a stirring speed of 0.55 m/s has the equation $y = -0.1309x + 0.8922$, line 17 corresponding to a stirring speed of 0.825 m/s has the equation $y = -0.4826x + 0.8265$, and curve 18 corresponding to a stirring speed of 1.1 m/s has the equation $y = 0.4554x + 0.5543$.

It is evident that the results obtained for a stirring speed of 0.825 m/s and of 1.1 m/s are nearly identical.

This can be explained by the fact that the minimum speed for achieving total suspension has been reached; this speed can be estimated to be approximately 0.84 m/s (0.85 m/s for particles having a diameter of 70 microns), where the minimum speed for particles of 500 microns can be estimated at 12 m/s, resulting in these particles remaining in the bottom of the beaker with a certain movement.

Once the totality of the surface of zinc is available, there is no change in the behavior of the system, that is between the results obtained at 0.825 m/s and at 1.1 m/s, which leads one to consider the possibility that the key parameter is the contact surface of available zinc and consequently that imparting turbulence to the flow starting at a certain threshold contributes nothing in terms of the effectiveness of the method.

Figure 9:
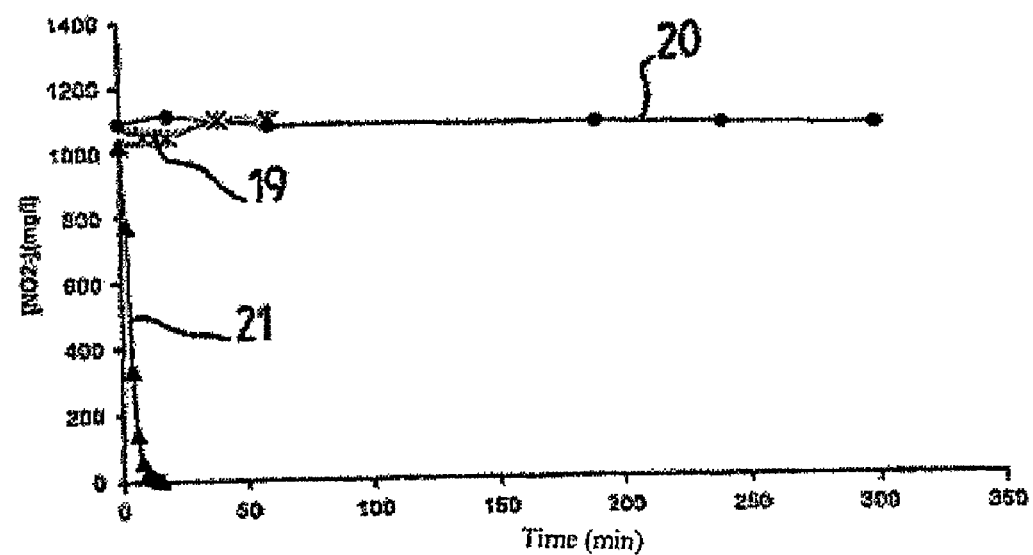
FIG. 9 represents the history of the concentration of nitrites in the liquid medium as a function of the duration of the treatment according to the pH of the liquid medium.

FIG. 9 illustrates the history of the concentration of nitrites as a function of the duration of the treatment, expressed in minutes, according to the pH of the solution.

In this figure, curve 19 corresponds to a pH equal to 11, curve 20 corresponds to a pH=8, and curve 21 to a pH equal to 5.

These results confirm that the reduction of the nitrites by zinc is more rapid at an acidic pH and allows the obtention of a 100% conversion rate of the nitrites in relatively short reaction times, that is, on the order of 16 minutes.

In contrast, when the pH is greater than 6, the reaction rate of the reduction of the nitrites is considerably decreased, where this decrease can be explained by the decrease in the number of protons in solution, and also by the formation of a precipitate of zinc hydroxide that deposits on the zinc powder and considerably reduces the exchange surface area, the latter being an important parameter in the method of the invention.

Figure 10:
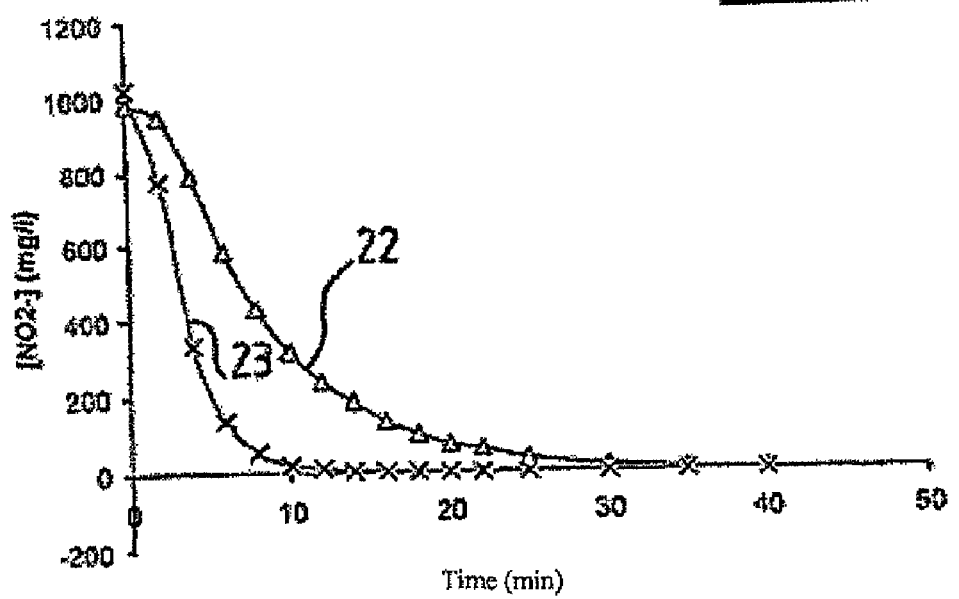
FIG. 10 represents the history of the concentration of nitrites in the liquid medium as a function of the duration of the treatment according to the weight of the zinc powder used.

FIG. 10, to this effect presents the history of the concentration of nitrites as a function of the duration of the treatment expressed in minutes, for different weights of zinc powder, and thus for different exchange surface areas, in the solution of nitrites.

Curve 22 corresponds to a weight of zinc of 5 g, and curve 23 corresponds to a weight of zinc of 10 g.

It is evident that the higher the weight of zinc added to the solution is, the more the duration required for the total reduction of the nitrites decreases, which can be explained notably by the increase in the contact surface area between the zinc and the aqueous solution of nitrites.

It is industrially advantageous to work with zinc chips instead of zinc powder, notably to prevent the presence of suspended zinc particles in the solution to be treated.

However, when zinc chips are used, it is preferred for the chips to contain 5% impurities, and for chips that are soiled with grease to be degreased and rinsed with demineralized water.

The experiments that have been conducted with zinc chips, and whose results are presented below, consist in adding the zinc chips to a volume of 1.5 liters of a solution of nitrites and to carry out the stirring of the solution of nitrites using a mechanical stirrer equipped with a Teflon moving body.

Figure 11:
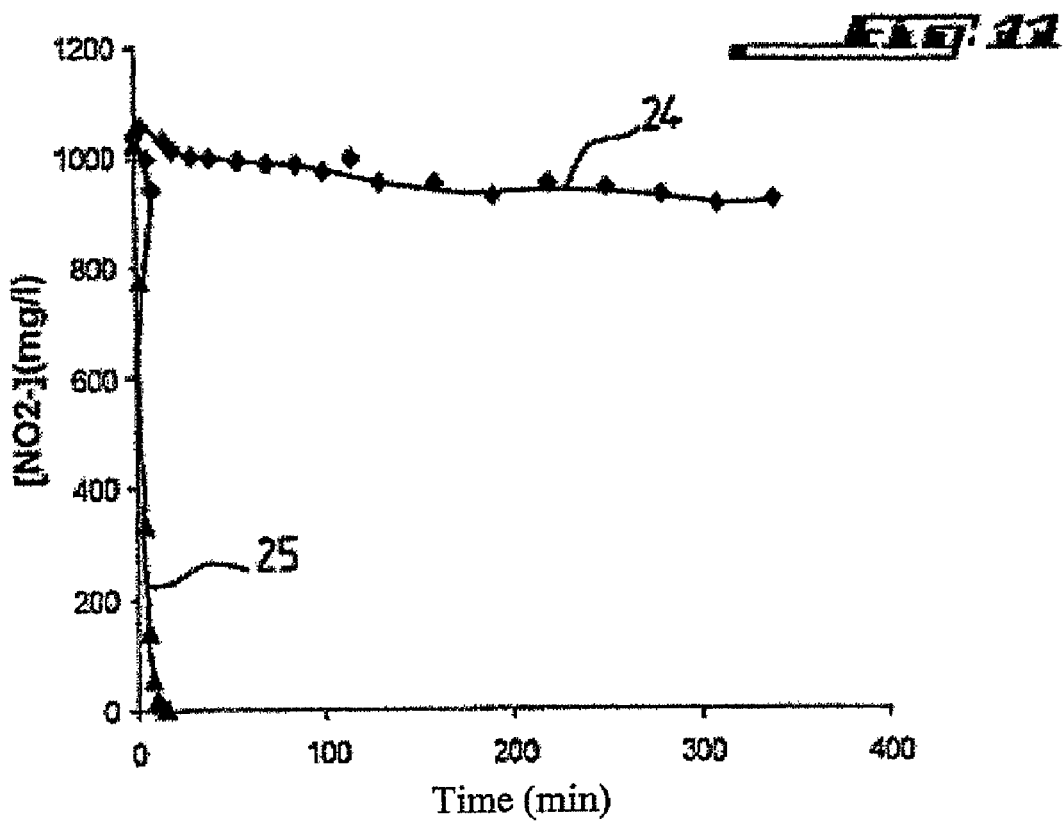
FIG. 11 represents the history of the concentration of nitrites in the liquid medium as a function of the duration of the treatment depending on whether zinc used is in the form of a powder or of chips.

FIG. 11 illustrates the comparison between the history of the concentration of nitrites expressed in mg/L, as a function of the duration of the treatment expressed in minutes, when the zinc is used in the form of a powder, and the same history when the zinc is used in the form of chips, for a pH in the solution maintained constant at 5 for the entire duration of the experiment, where the stirring speed of this solution is 1.1 m/s.

Curve 24 corresponds to the use of zinc chips for an exchange surface area of 0.04 $m^2$, and curve 25 corresponds to the use of zinc powder for an exchange surface area of 4.14 $m^2$.

From these two curves, it is apparent that the reduction of the nitrites is slower with zinc chips, which can be explained by the decrease in the exchange surface area, which is approximately 100 times smaller in the case of the chips compared to the case of the powder.

Figure 12:
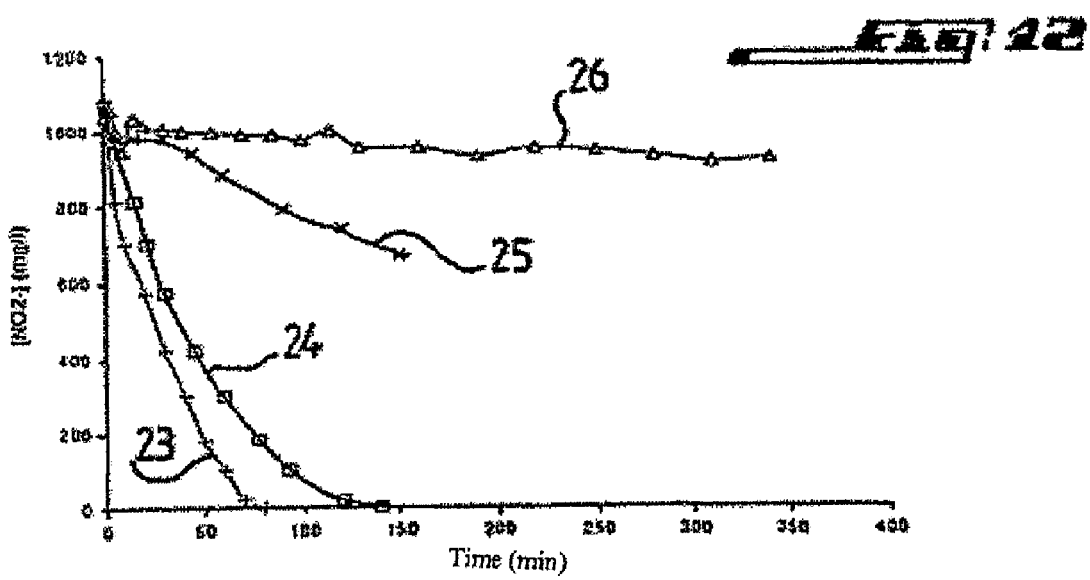
FIG. 12 represents the history of the concentration of nitrites in the liquid medium as a function of the duration of the treatment when zinc chips are used and according to the pH of the liquid medium.

However, the decrease in the exchange surface area resulting from the use of zinc chips can be compensated by a lowering of the pH, as shown by the results presented in FIG. 12.

In this figure, which represents the history of the concentration of nitrites as a function of the duration of the treatment expressed in minutes, curve 26 corresponds to a pH of the solution maintained at 5, curve 25 corresponds to a pH of the solution maintained at 4, curve 24 corresponds to a pH of the solution maintained at 3, and curve 23 to a pH of the solution maintained at 2.

It results from these results that, by using zinc chips with an exchange surface area of only 0.04 m² per liter of solution and with a stirring speed of 1.375 m/s, it is possible at pH 2 to obtain a total reduction of the nitrite ions in a solution having an initial concentration of nitrites of 1 g/L in a treatment duration of 80 min with a total consumption of 2M hydrochloric acid of 97 mL, which made it possible to maintain the pH at its initial value for the entire duration of the treatment.

The increase in the reaction rate with a decrease in the pH of the solution of the nitrites is in conformity with the results obtained previously with zinc powder and a solution loaded with nitrates.

Figure 13:
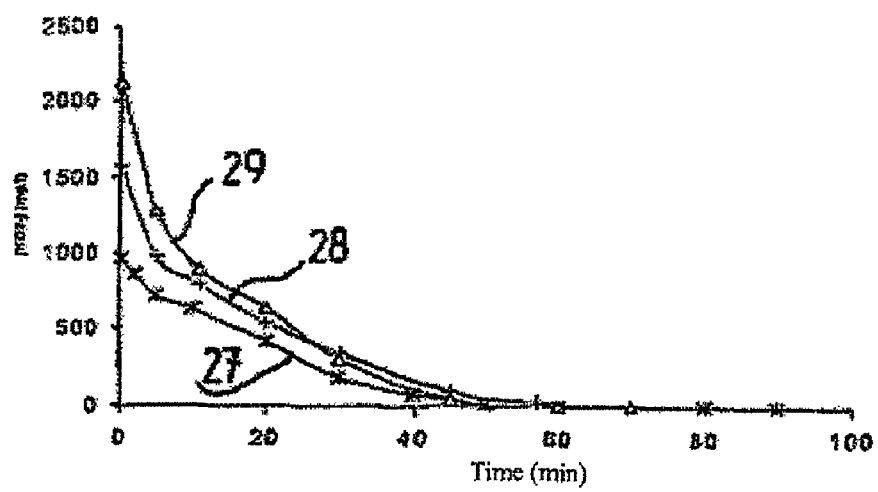
FIG. 13 represents the history of the concentration of nitrites in the liquid medium as a function of the duration of the treatment according to the initial concentration of nitrites.

On the other hand, the rate of reduction of the nitrites is nearly identical, regardless of what the initial concentration of nitrites is, as shown by the results presented in FIG. 13, which represents the history of the concentration of nitrites as a function of the duration of the treatment expressed in minutes, in which curve 29 corresponds to the use of a solution of nitrites having an initial concentration of nitrites of more than 2000 mg/L, curve 28 corresponds to an initial concentration of nitrites of approximately 1500 mg/L, and curve 27 to an initial concentration of nitrites of 1000 mg/L.

Curves 27-29 correspond to treatments carried out at a pH of 2, which is adjusted for the entire duration of the treatment, with a weight of chips of 15.79 g corresponding to an exchange surface area of 0.04 m² per liter of solution and a stirring speed of 1.375 m/s. According to the results of FIG. 13, regardless of what the initial concentration of nitrites is, the total reduction of the nitrites in solution is obtained in an approximately identical treatment duration of 60 min.

Tests with zinc chips were also carried out using a solution loaded with nitrates at an initial concentration of 1 g/L and prepared from potassium nitrate.

The reduction is carried out in a batch reactors in which 15.79 grams of zinc chips are added to the nitrate solution having a volume of 1 L.

The pH is maintained constant manually at a value of 2 for the entire duration of the treatment by the regular addition of 2M hydrochloric acid.

Figure 14:
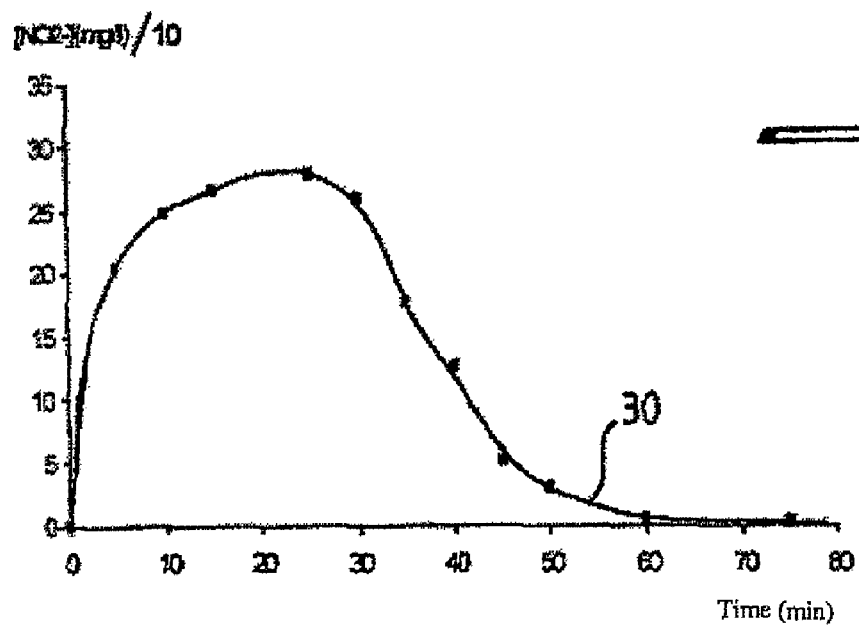
FIG. 14 represents the history of the concentration of nitrites in the liquid medium as a function of the duration of the treatment when the liquid medium is initially loaded with nitrates.

The treatment is carried out at ambient temperature, and FIG. 14 presents the history of the concentration of nitrites in the solution of nitrates as a function of the treatment duration, expressed in minutes.

According to the results of FIG. 14, the concentration of nitrites during the first 25 min of treatment increases to reach a maximum concentration of approximately 280 mg/L, and, after 75 min of treatment, a reduced concentration of nitrites of 0.5 mg/L.

A complementary measurement of the concentration of nitrates after 75 min of treatment shows a final concentration of nitrates of 0 mg/L.

These results confirm the reduction of the nitrates and of the nitrites by the addition of zinc chips to a solution of nitrates at ambient temperature and at an acidic pH.

FIGS. 15-22 illustrate experimental results, which explain the phenomena induced by the presence of zinc in a solution of nitrates and which were conducted to determine the parameters involved in the reduction reactions.

Indeed, the reduction kinetics depend directly on the reactions on the surface of the zinc, and also on the events of transfer of the nitrite ions towards the zinc.

When the speed of total suspension of the particles of zinc, in the case of the use of zinc powder, is reached, the transfer of the nitrite ions in the liquid towards the zinc is limited by the diffusion. The transferred flow is written as follows:

$$N = \frac{dC}{dT} = K \cdot S \cdot \Delta C \Rightarrow \int_{Co}^{C} \frac{dC}{c-c} = \int_{0}^{t} K \cdot S \cdot dt$$

$$\Rightarrow \ln\frac{C}{Co} - K \cdot S \cdot t$$

Figure 15:
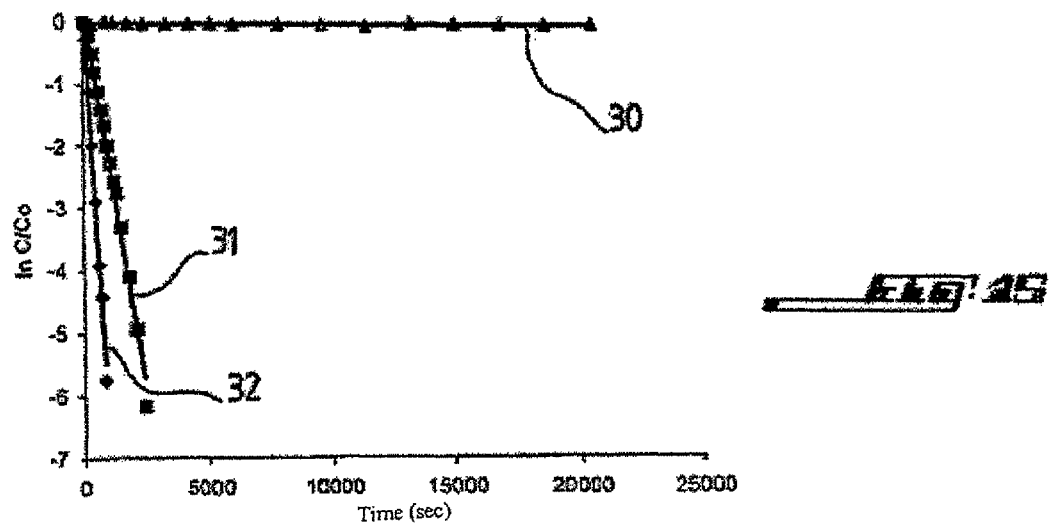
FIG. 15 represents the history of the Ln C/Co of nitrites as a function of the duration of the treatment according to the weights and shapes of zinc used.

FIG. 15 represents the history of ln (C/Co) as a function of the treatment duration expressed in seconds for different weights and shapes of zinc, namely powder and chips, and thus for different contact surface areas.

Line 30 of FIG. 15 corresponds to the use of zinc chips with a contact surface area of 0.004 m², line 31 corresponds to the use of zinc powder with a contact surface area of 2.07 m², and line 32 illustrates the results obtained with zinc powder with a contact surface area of 4.14 m².

The slope of each line represents the product K×S, which can be used to determine K provided that the surface area can be determined.

When zinc is used in the powder form, the calculations of the surface are approximate because this powder consists of a mixture of spherical particles having diameters between 10 and 500 micrometers.

The estimate of the surface area is based on the median diameter indicated by the granulometer.

For the chips, the estimate of the surface area is made from measurements of the surface area and of the weight.

Considering the stirring regimen to be correct, it is possible to obtain a first estimate of the matter transfer coefficients, as presented in the following Table 2.

TABLE 2

|  | Zinc weight (g) | Exchange surface area (m²) | K · S (s⁻¹) | K (m²s⁻¹) |
|---|---|---|---|---|
| Powder | 5 | 2.07 | 2.5 · 10⁻³ | 1.208 · 10⁻³ |
|  | 10 | 4.14 | 7 · 10⁻³ | 1.691 · 10⁻³ |
| Chips | 15.79 | 0.00395 | 5 · 10⁻⁶ | 1.266 · 10⁻³ |

Based on these results, the transfer coefficient for the chips is very similar to the one obtained with the powder, which implies that the hydrodynamic conditions are similar and thus that one cannot consider the effects observed to be due only to the chemical kinetics.

As far as the reaction of reduction of the nitrites on the surface of the zinc is concerned, this reaction is heterogeneous, irreversible and characterized notably by a nitrogen degassing. The partial orders with respect to each constituent correspond to the stoichiometric coefficient.

It is thus necessary to determine the partial orders with respect to each constituent, and it is sufficient for this purpose to isolate each constituent using the isolation method of Ostwald, which consists in using a large excess of all the reagents with respect to each constituent studied.

The basic reaction, taking into account all the possible interactions, can be presented as follows:

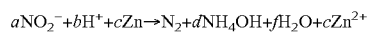

$aNO_2^- + bH^+ + cZn \rightarrow N_2 + dNH_4OH + fH_2O + cZn^{2+}$

In this equation, the possible, but not demonstrated, formation of NOx is not taken into account.

The reaction rate of the nitrites can be expressed as follows:

$$\frac{-d[NO_2]}{dt} = k[NO_2^-]^a Zn^c [H^+]^b = k'[NO_2^-]^a \text{ with } k' = k Zn^c [H^+]^b$$

By carrying out experiments with constant concentrations for the constituents other than the nitrites, it is possible to determine the partial order with respect to the nitrites.

As far as zinc is concerned in the study, since the reaction on the surface is heterogeneous, the comparison must be made using a single type of zinc, and assuming that the available surface area of zinc is proportional to the weight of the zinc.

Tests were carried out with zinc powder at the concentrations of 5 g/L and 10 g/L at two different pHs, 4 and 5, respectively.

Figure 16:
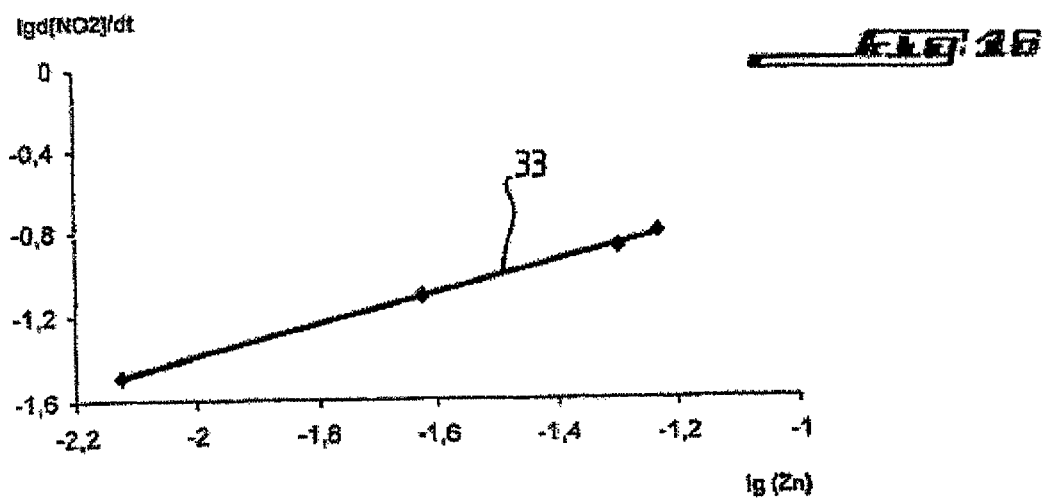
FIG. 16 represents the change of log $d([NO_2^-]/dt)$ as a function of log (Zn)

The results are presented in FIG. 16 in which line 33 represents the change of log d[NO$_2$]/dt as a function of log (Zn).

These results should show a slight difference at the level of the ordinate at the origin, but small concentrations of protons have an insignificant effect.

Figure 17:
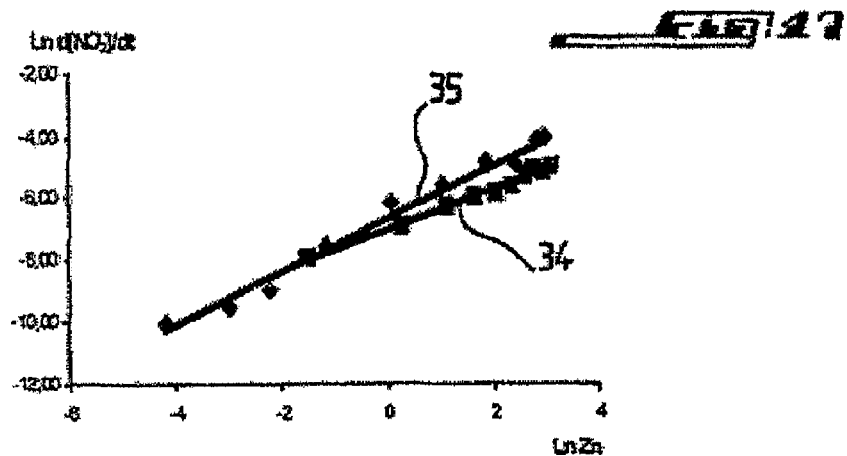
FIG. 17 represents the change of ln $d([NO_2^-]/dt)$ as a function of ln (Zn) according to the pH of the liquid medium.

The partial order with the zinc chips at pH 2 and pH 3 was also studied, and the results are presented in FIG. 17 in which, as in FIG. 16, log d[NO$_2$]/dt is expressed as a function of log (Zn), and in which line 34 corresponds to a pH of 3 and curve 35 corresponds to a pH of 4.

From these results representing the speed of reduction of the nitrites as a function of the pH with the same weight of zinc, one gets c=0.744 and k'=0.093.

The partial order with respect to the nitrites with the zinc chips varies slightly with the pH, but an average of 0.749 is indicated, which is in agreement with the preceding result. Naturally, this same constant is not found for the two pH values studied.

As far as the study of the pH is concerned, this study was carried out successively with zinc powder and with zinc chips.

Figure 18:
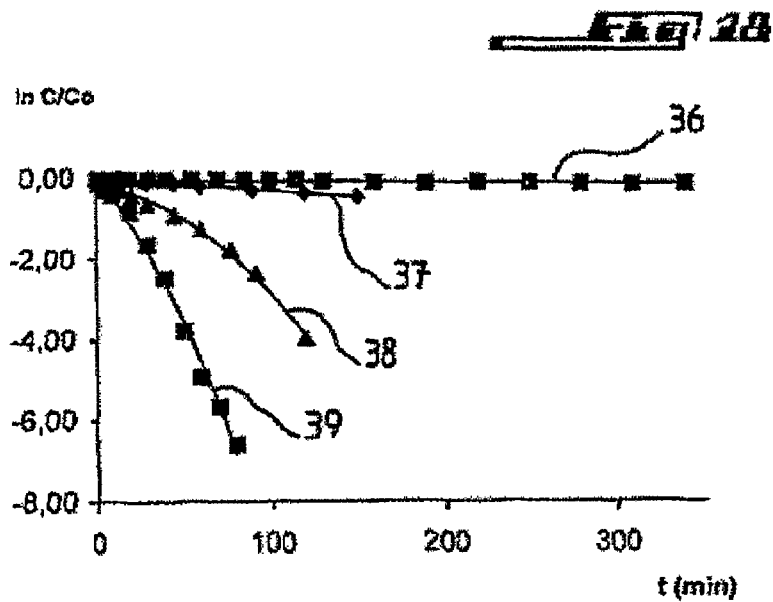
FIG. 18 represents the history of Ln C/Co of nitrites as a function of the duration of the treatment according to the pH of the liquid medium.

The results are expressed in FIG. 18, which expresses the history of Ln (C/Co) of nitrites as a function of the duration of the treatment, and in which curve 63 corresponds to a pH of 5, curve 37 corresponds to a pH of 4, curve 38 corresponds to a pH of 3, and finally, curve 39 corresponds to a pH of 2.

The calculation of the equation of these curves shows that the correlations Ln(C/Co)=f(t) are not lines and that, consequently, from this first approximation and using the theory of Van't Hoff, the reaction cannot have a partial order of 1 with respect to the protons.

Figure 19:
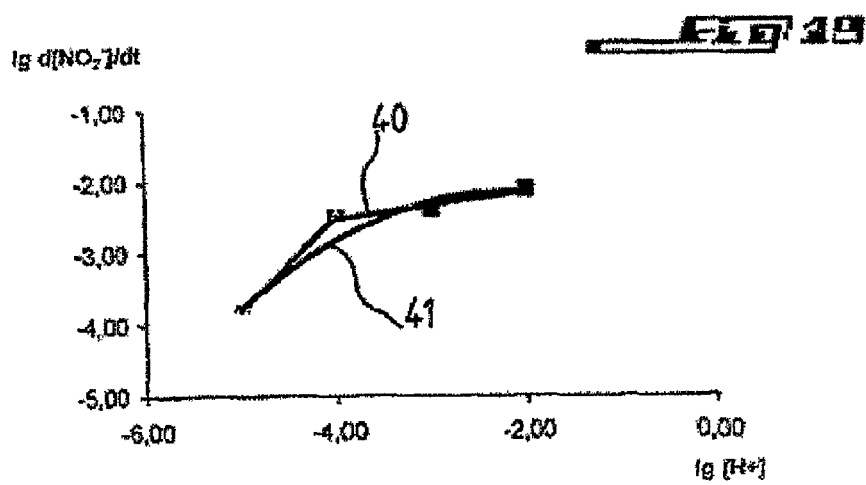
FIG. 19 represents the change of log $d([NO_2^-]/dt)$ as a function of log $(H^+)$ according to the pH of the liquid medium.

In addition, a very noticeable difference in the behavior of the system appears between pH 2 and pH 4 and 5, and this, with accordance to the representation in FIG. 19, in which curve 40 represents the rate of reduction of the nitrites as a function of log [H+] for the pH of X, and curve 41 corresponds to those of pH X.

The difference in the behavior for these two pH ranges originates in different reaction mechanisms and it must lead to different proportions between the products of the reaction.

Indeed, the system evolves progressively from one mechanism towards another one, with an important change at approximately pH 4.

As far as the study for the nitrites is concerned, tests concerning the partial order for the nitrites were carried out in two parts for two different pH values.

FIG. 20 represents the change of log d[NO$_2$]/dt as a function of log [NO$_2$] for 2 different pH values, namely a pH of 2, as illustrated by curve 42, and a pH of 3, as illustrated by curve 43.

From this evaluation of the partial order with respect to the protons at low pH, it is apparent that by increasing the pH, the partial order with respect to the nitrites decreases.

In the same step, the analysis of the reaction mechanism suggests the formation of ammonium, whose concentration increases with the decrease in pH.

Kjeldahl nitrogen analyses confirmed this supposition, and the actual results are slightly below the theoretical predictions, by approximately −15%.

This difference is probably due to a partial stripping of ammonia between the time of the collection of the sample and the time of the assay.

FIG. 21 illustrates the results obtained under the same experimental conditions as those whose results are represented in FIG. 20, but here curve 44 corresponds to a pH of 4 [and curve 45] to a pH of 5.

According to these results, it appears that, if the pH is above 3.5-4, the change in the mechanism occurs, and the partial order for the nitrates again approaches the one obtained at pH=2, but the conditions being different, one does not obtain the same mechanism.

In addition, less ammonium was detected in the treated solution, which can be attributed, on the one hand, to a reaction mechanism in which a part of the ammonium is used to reduce the nitrites, using the zinc as catalyst, and on the other hand, to the stripping of the ammonia, which accelerates with the change to neutral pH values.

In addition, the use of the zinc chips changes the given situation, since the small contact surface area does not allow the zinc to play the dual role of reducing agent and catalyst.

FIG. 22, in which curve 46 represents the history of the partial order with respect to the nitrites with zinc chips at pH 4 demonstrates, in the dispersion of the points observed in this figure, the change in priority as a function of the concentration of the intermediate products, namely NO$_2^-$ and NH$^{4+}$.

This study of the chemical kinetics, which is illustrated by FIGS. 15-22, shows that the more acidic the pH is, the more rapid the reduction is, but that at the same time, the formation of ammonium is strongly promoted and more acid is consumed.

The possibility of accelerating the reaction while decreasing the formation of this product resides in the use of a larger contact surface area when zinc chips are used.

While this study of the partial order detects key parameters in the reduction reaction, these tests are all carried out on solutions prepared from sodium nitrate and nitrite.

This is the reason why tests are carried out on the reduction of nitrites and of nitrates in drainage waters containing a high proportion of nitrates, and also containing a multitude of other chemical elements, and the results of these tests are presented below.

Indeed, a verification must be conducted to determine whether the reduction of nitrates by zinc is ensured in the presence of other mineral compounds that can also be reduced, such as sulfates, and phosphates or other elements that can limit the reduction of the nitrates and of the nitrites by deposition on the surface of the zinc.

The drainage waters that were treated present a nitrate concentration of 1.99 g/L.

These drainage waters are treated by the addition of 10 g of zinc powder in a volume of 250 mL of drainage water at a temperature of approximately 20° C., under magnetic stirring and at an initial pH of 3.6, which is produced by the addition of hydrochloric acid.

FIG. 23 illustrates the results obtained in terms of the concentration of nitrates, presented in the form of histograms in which black bars 46 correspond to the concentration of nitrates and gray bars 47 correspond to the concentration of nitrites.

One notes that the total reduction of the nitrates and nitrites present in the drainage water is reached after 3 h of treatment.

This reduction time is slightly increased compared to the reduction time of the nitrates and nitrites in an artificial solution which is loaded with nitrates, which can be explained by the presence of interfering compounds that are present in the drainage waters.

FIGS. 24a and 24b show the influence of the treatment temperature on the reduction time of nitrates and of nitrites in the drainage water with a pH which is adjusted every half hour and maintained in this manner at a value of less than 6 by the regular addition of hydrochloric acid.

In FIGS. 24a and 24b, the concentrations of nitrates are presented by black bars 48a, 48b, respectively, and the concentrations of nitrites are represented by gray bars 49a, 49b, respectively.

FIG. 24a corresponds to a temperature of the reaction medium of 20° C., and FIG. 24b corresponds to a temperature of the reaction medium of 80° C.

As in the case of an artificial solution of nitrates, an elevation of the temperature of the reaction medium makes it possible to decrease the reaction time, where the reaction time was reduced by approximately 3 h when working at 80° C. compared to the results obtained at 20° C.

As with an artificial solution of nitrates, the regular adjustment of the pH of the reaction medium remains an important parameter, which makes it possible to decrease the reaction time and also to obtain a good reproducibility of the results.

Figure 25:
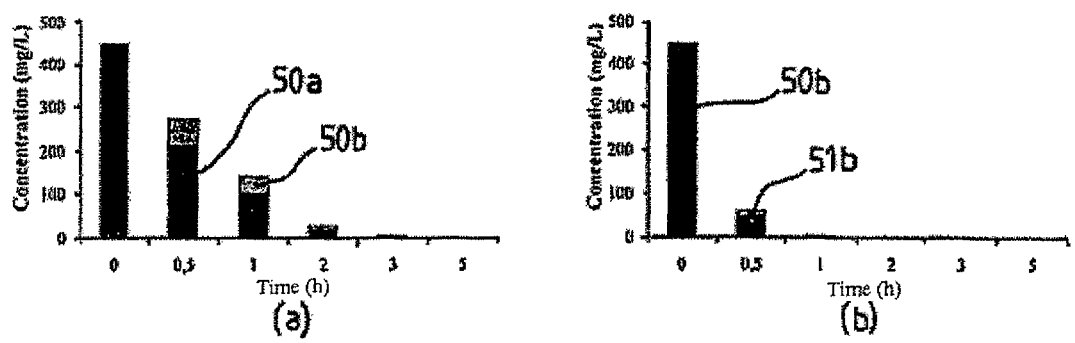
FIGS. 25a and 25b represent the change in the concentrations of nitrates and of nitrites as a function of the duration of the treatment when the liquid medium consists of drainage waters according to the temperature of the reaction medium when the pH is adjusted every quarter of an hour for the first hour of the treatment and then every half hour.

To this effect, FIGS. 25a and 25b demonstrate the importance of the regular adjustment of the pH during the reduction of the nitrates and nitrites in the drainage waters.

FIG. 25a represents the results obtained in terms of concentration of nitrates, where the results are represented by black bars 50a, and in terms of concentration of nitrites, where the results are represented by gray bars 51a, when the temperature of the reaction medium is 20° C., and when the pH is adjusted to a value of less than 6 every quarter of an hour for the first hour of treatment, and then every half hour after the first hour of treatment.

FIG. 25b represents the history of the concentration of nitrates, which is represented by black bars 50b, and the change in the concentration of nitrites, which is represented by gray bars 51b, when the temperature of the reaction medium is 80° C. with a pH adjustment identical to the one corresponding to the experimental conditions of FIG. 25a.

Again, one notes an improvement of the effectiveness of the treatment when the temperature of the reaction medium increases and one also notes, by comparing the results of FIG. 25a with those of FIG. 24a, and by comparing the results of FIG. 25b and FIG. 25a, that the more regularly the pH is adjusted during the treatment, the higher the reduction of the nitrates and of the nitrites is.

The results are entirely in conformity with those obtained with an artificial solution of nitrates.

Figure 26:
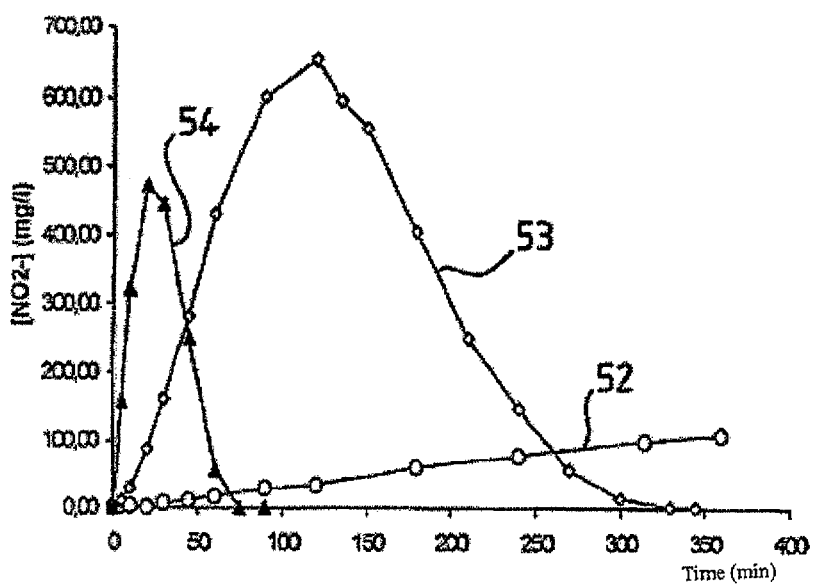
FIG. 26 represents the history of the concentration of nitrites as a function of the duration of the treatment according to the pH of the liquid medium.

FIG. 26 shows the change in the concentration of nitrites in the drainage water, when 15.79 g of zinc chips are added to a solution of 1 L consisting of drainage water with a pH that is maintained constant manually by the regular addition of 2M hydrochloric acid and at a stirring speed of 1.37 m/s.

Curves 52, 53 and 54 of FIG. 26 correspond to a pH of the solution that is maintained at 4, 3, and 2, respectively, for the entire duration of the treatment.

According to these results, it is evident that the rates of formation and of reduction of the nitrites in solution vary with the pH and that, when the pH decreases, these rates increase.

It also is evident that the maximum concentration of nitrites during the course of the treatment is lower when the pH is maintained at 2, in comparison to a pH maintained at 3.

These results present the same trend as the results obtained with the zinc powder, since, at pH 2, and as represented in FIG. 26, the yield of conversion of the nitrites is 100% after 75 minutes, and moreover, the concentration of nitrates after 75 minutes of treatment, which was measured, is 1.78 mg/L; the latter value is in good compliance with the applicable release standards.

The slowing of the reaction of reduction of the nitrates and of the nitrites, in comparison to the artificial solution, is attributed to the presence of sulfates and of phosphates, which participate in the induced reactions in the drainage waters.

Figure 27:
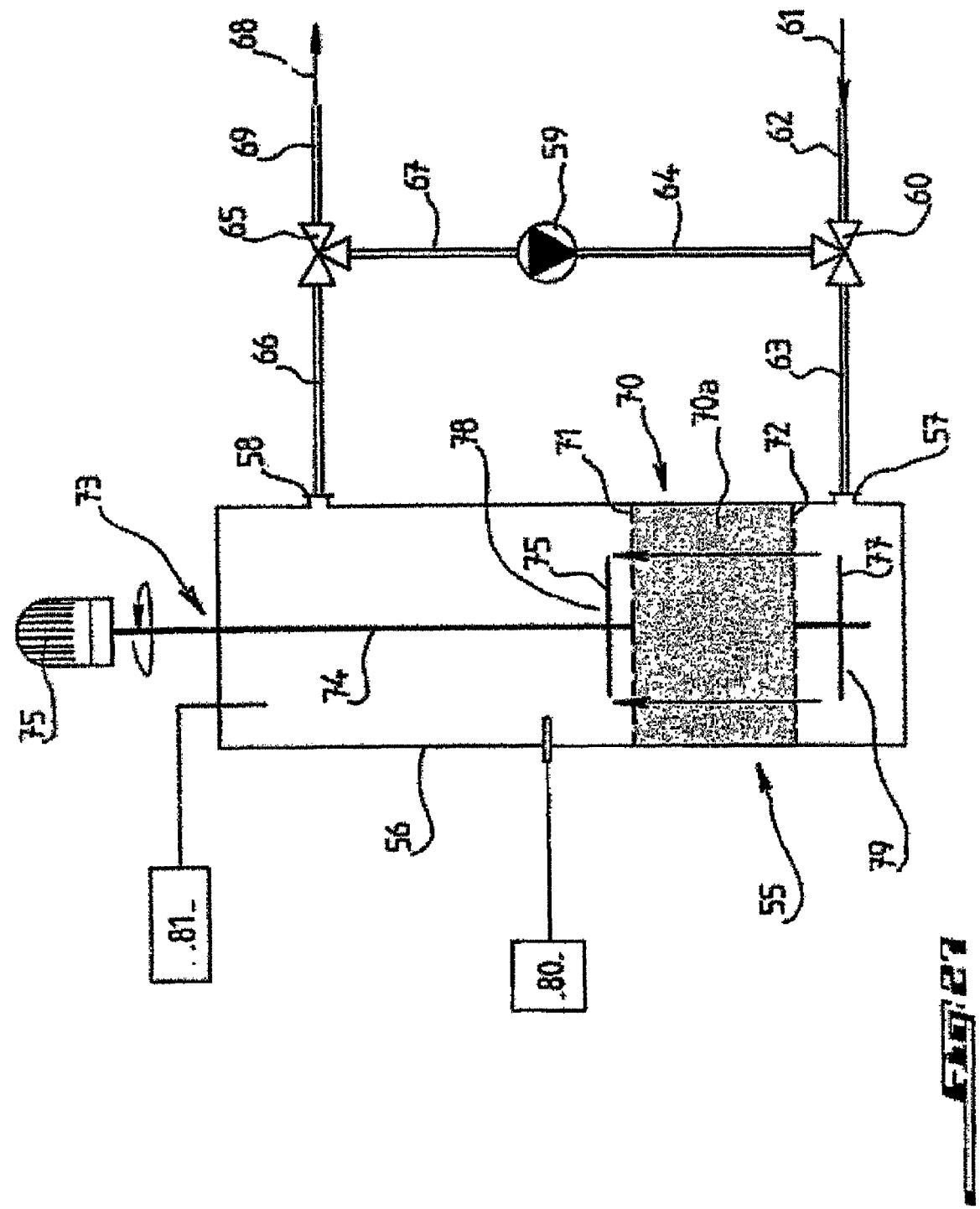
FIG. 27 is a schematic representation of the device of the invention according to a first embodiment.

With reference to FIG. 27, the device of the invention, 55, according to another embodiment, comprises a first treatment enclosure 56 made of stainless steel and having a volume of 40 L and a useful volume of 36 L, whose lower part comprises a liquid inlet 57 and whose upper part comprises a liquid outlet 58.

A recirculation pump 59 makes it possible to ensure the circulation of the liquid in the enclosure 56 at a flow rate of approximately 600 L/h from the liquid inlet 57 to the liquid outlet 58, from which the liquid circulates into a first pipe 66 to a first three-way valve 65 that allows either the evacuation of the treated liquid 68 contained in the enclosure 56 by causing it to circulate in a second pipe 69, or the circulation of said liquid in a third pipe 67 leading to the pump 59.

From the pump 59, the liquid then circulates in a fourth pipe 64 to a second three-way valve 60, and then in a fifth pipe 63 leading to the liquid inlet 57.

The filling of the enclosure 56 at the beginning of the treatment is carried out by causing the liquid to be treated 61 to circulate in a sixth pipe 62, and then in the fifth pipe 63 through the second three-way valve 60.

In the first treatment enclosure 56, a zinc layer 70 having a height of approximately 10 cm, prepared by the compression of zinc chips 70a between two perforated plates 71, 72, is arranged transversally in the low part of the first enclosure 56 over the entire width of the enclosure 56 so that all the liquid circulating in the enclosure traverses the zinc layer 70.

The stirring of the liquid layer in the enclosure 56 is ensured by a stirrer 73 comprising a vertical rod 74, whose rotation is ensured by a motor 75 to which this rod 74 is connected, and two stirring blades 76, 77, which are integrally connected to the vertical rod 74 and arranged below and above the zinc layer 70, respectively, thus defining the first stirring zone 78 and the second stirring zone 79 of the liquid.

The maximum stirring speed of the stirrer 73 in the device of the invention according to the first embodiment is 0.84 m/s.

The pH of the first stirring zone 78 is controlled by a pH probe 80 traversing the enclosure 56 at the level of the zone 78 and it is adjusted by a pH adjustment means 81, which allows the addition of 35% by weight hydrochloric acid to the liquid which circulates in the enclosure 56.

Thus, the liquid medium to be treated circulates at least once in the enclosure 56 by traversing the layer of zinc chips 70a, and by being subjected to permanent stirring and to pH regulation.

Figure 28:
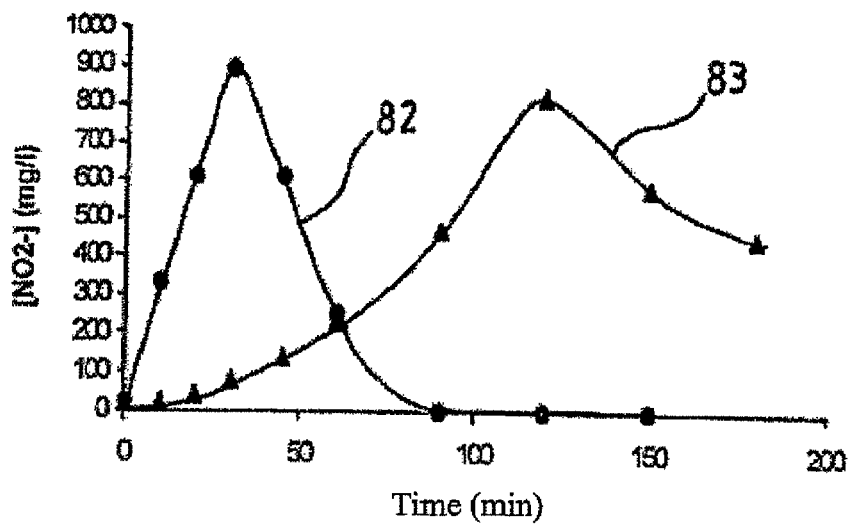
FIG. 28 represents the history of the concentration of nitrites as a function of the duration of the treatment according to the pH and the weight of the zinc chips used when the liquid medium is treated in the device of the invention.

FIG. 28 illustrates the results obtained in terms of concentration of nitrites when a solution having an initial concentration of nitrates is [sic; of] 2 g/L is treated in the device 55, which is represented in FIG. 27, with a flow rate of 1500 L/h, ensured by the pump 59.

Curve 82 corresponds to a treatment during which the pH is maintained at 2 and in which 6000 g of zinc chips are used to prepare the zinc layer 70.

Curve 83 corresponds to a treatment in which the pH is maintained at 3 and in which 5000 g of zinc chips are used to prepare the zinc layer 70.

One notes that the total reduction of the nitrites is obtained at pH 2 with a weight of zinc of 6000 g after 90 min of treatment.

According to curve 83, by maintaining the pH of the solution at 3 with a weight of zinc of 5000 g, the produced peak of nitrites presents a delay of approximately 100 min compared to the peak of nitrites of curve 82.

An increase in the weight of zinc based on a ratio of available zinc surface area/volume of liquid treated would make it possible to increase the effectiveness of the treatment even further.

Figure 29:
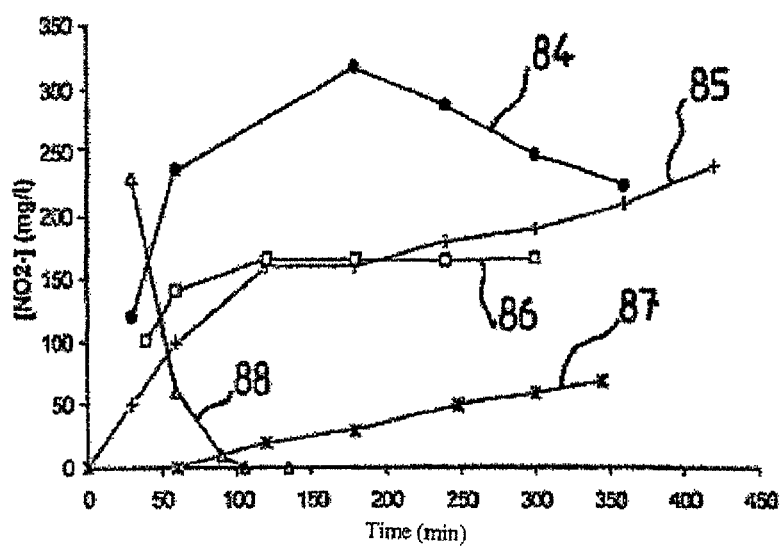
FIG. 29 represents the history of the concentration of nitrites as a function of the duration of the treatment according to the pH and the weight of the zinc chips used when the liquid medium is treated in the device of the invention.

FIG. 29 illustrates the history and the concentration of nitrites in drainage waters having an initial concentration of nitrates of 1.99 g/L, when these drainage waters circulate in the device of the invention 55, which is represented in FIG. 27 and for a rate of circulation of the liquid in the enclosure 56 of 360 L/h.

With reference to FIG. 29, curve 84 corresponds to a pH maintained at 3 for a weight of zinc of 6000 g, curve 85 corresponds to a pH maintained at 3 for a weight of zinc of 758 g, curve 86 corresponds to a pH maintained at 3 for a weight of zinc of 1516 g, curve 87 corresponds to a pH maintained at 3 for a weight of zinc of 378 g, and finally, curve 88 corresponds to a pH maintained at 2 for a weight of zinc of 6000 g.

According to these curves, it is evident that the increase in the weight of zinc and the decrease of the pH make it possible to increase the effectiveness of the treatment.

Indeed, at a pH of 2 and for a weight of zinc of 6000 g, as illustrated by curve 88, a treatment of 105 minutes make it possible to obtain drainage waters having a zero concentration of nitrites and a measured concentration of nitrates of 27 mg/L, which is below the threshold of 50 mg/L.

Consequently, the device of the invention makes it possible, from drainage waters which are loaded with approximately 2 g/L nitrates, to reduce nearly all the nitrates by the obtention of a final concentration of nitrates of less than 30 mg/L, while completely eliminating the nitrites formed during the reaction of reduction of the nitrates by the zinc.

Table 3 presents the exchange surface area between the zinc and the solution when zinc chips are used, in comparison to the use of zinc powder.

TABLE 3

| Type | Quantity | Total surface area (m²) | Surface area per liter (m²/L) | KA |
|---|---|---|---|---|
| Powder | 10 g | 4.14 | 4.14 | 0.414 |
| Zinc chips | 378 g | 0.624 | 0.0156 | 0.0037 |
|  | 758 g | 1.248 | 0.0312 | 0.0075 |
|  | 1516 g | 2.504 | 0.0626 | 0.015 |
|  | 6000 g | 10 | 0.25 | 0.06 |

Figure 30:
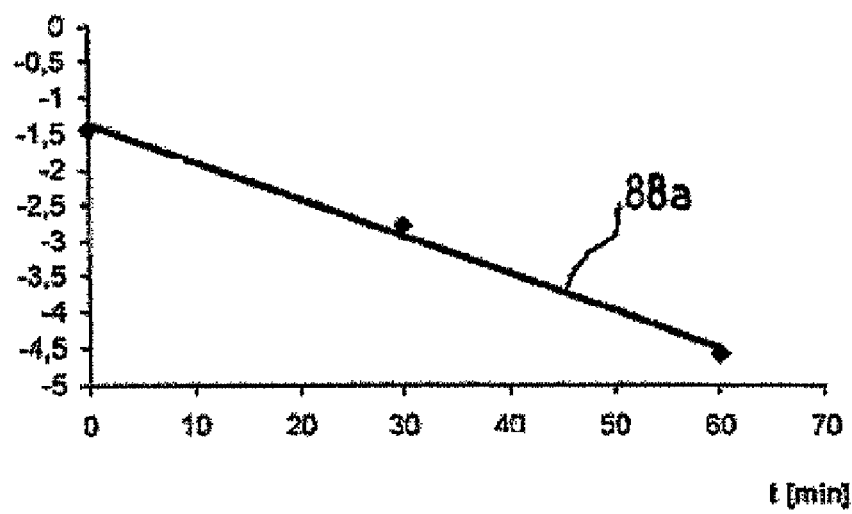
FIG. 30 represents the history of Ln C/Co of nitrites as a function of the duration of the treatment when the liquid medium is treated in the device of the invention.

FIG. 30 represents the history of the Ln of (C/Co) of nitrites with respect to the duration of the treatment expressed in minutes and the equation of line 88, obtained from FIG. 9, which is y=−0.0523x−1.3604, makes it possible to calculate the coefficient of exchange in the device of the invention, which coefficient is 0.006 kg/m² s.

Figure 31:
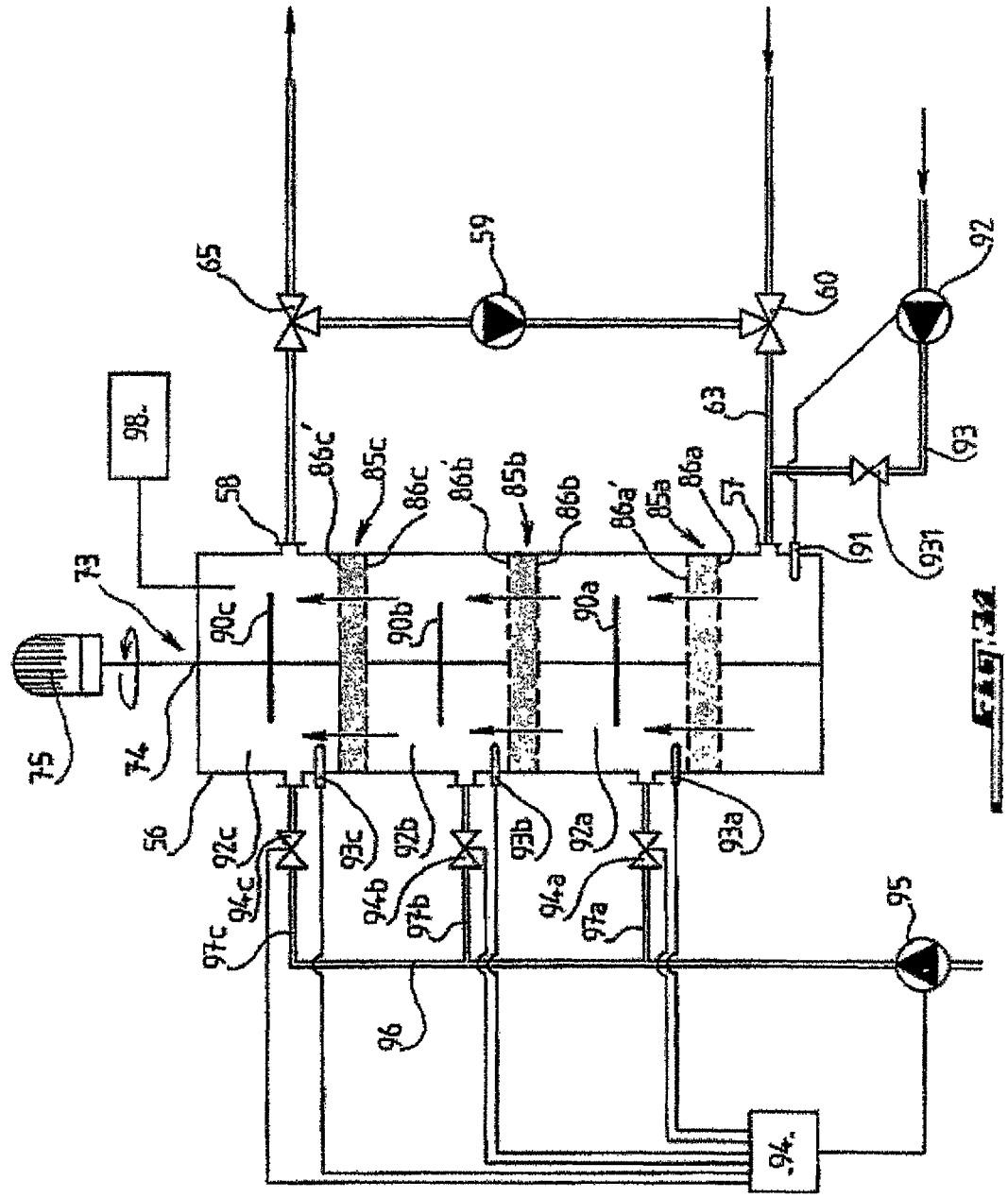
FIG. 31 is a schematic representation of the device of the invention according to a second embodiment.

FIG. 31 represents the device 55 of the invention according to a second embodiment in which the liquid inlet and outlet system of the enclosure 56 as well as the system for the recirculation of the liquid in the enclosure 56 involving the liquid inlet 57, the liquid outlet 58, two three-way valves 60, 65 and the pump 59 are identical to those of the device of the invention according to the first embodiment represented in FIG. 27 as well as the filling and emptying system of the enclosure 56.

The device represented in FIG. 31 comprises three transverse layers of zinc 85a, 85b, 85c having a height of less than 10 cm, which are regularly distributed over the entire height of the enclosure 56 so that the liquid circulating in the enclosure 56 circulates through the three zinc layers 85a, 85b, 85c, which are produced by the compression of zinc chips between two perforated plates 86a, 86a'; 86b, 86b'; 86c, 86c', respectively, where each layer of zinc chips 85a, 85b, 85c presents a height between 7 and 10 cm.

Just as for the device represented in FIG. 27, the stirring of the liquid medium is ensured by the stirrer 73, which consists of the vertical rod 74 connected to the motor 75 that ensures the rotation of the vertical rod and of three stirring blades 90a, 90b, 90c, which are integrally connected to the vertical rod 74 and arranged, respectively, in the stirring zones 92a, 92b, 92c located above each zinc layer 85a, 85b, 85c, respectively.

At the level of the liquid inlet 57, a pH probe 91 is connected to a pump 92, which can inject hydrochloric acid into the pipe 63 that opens on the liquid inlet 57 by causing the acid to circulate through a pipe 93 and a two-wave valve 931 controlled by a control enclosure, not shown, which is connected to the probe 91 and to the pump 92.

Thus, if the pH is too high in the lower zone of the enclosure 56, that is, under the first zinc layer 85a, an appropriate quantity of hydrochloric acid is injected into the enclosure 56, at the level of the liquid inlet 57.

In each stirring zone 92a, 92b, 92c, a pH probe 93a, 93b and 93c, respectively, measures the pH and is connected to an enclosure 94 connected to a pump for the injection of hydrochloric acid 95.

If one of the probes detects, or if the probes 93a, 93b, 93c detect, an increase in the pH, the pump 95 controlled by the enclosure 94 sends an appropriate quantity of hydrochloric acid through a principal pipe 96 and the pipe 97a, 97b and/or 97c connecting the pipe 96 to the stirring zone 92a, 92b, 92c, in which the pH probe 93a, 93b, 93c, respectively, detected an increase in the pH.

Each pipe 97a, 97b, 97c comprises a corresponding two-way valve 94a, 94b, 94c controlled by the enclosure 94 and allowing the hydrochloric acid circulating in the pipe 97a, 97b, 97c to be injected in the corresponding stirring zone 92a, 92b, 92c.

Finally, a nitrate detector 98 makes it possible to measure at any time during the treatment the quantity of nitrates present in the upper zone of the enclosure 56 of the device of the invention.

Figure 32:
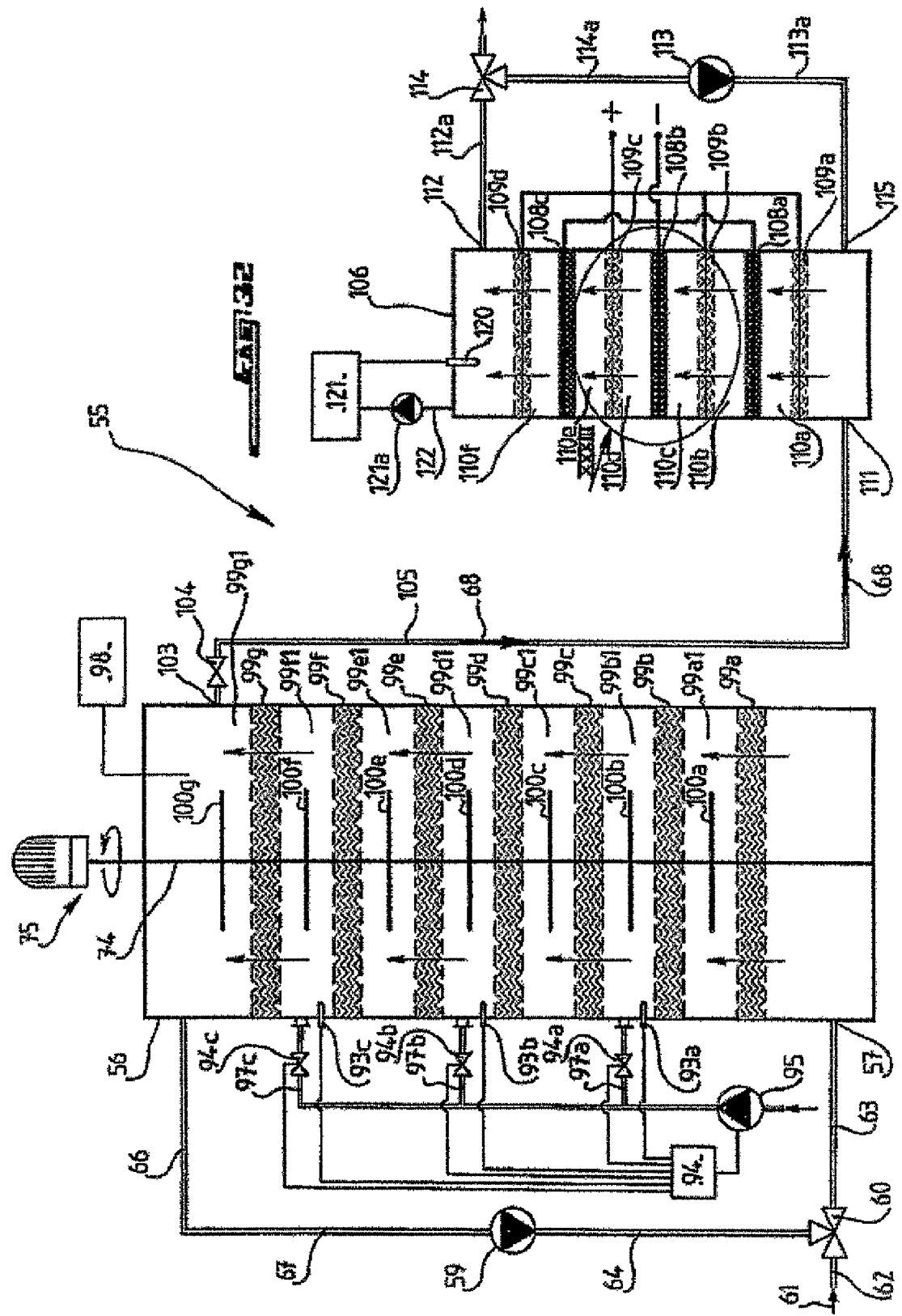
FIG. 32 is a schematic representation of the device of the invention according to a third embodiment when it also comprises a zinc reduction device.

With reference to FIG. 32, the first treatment enclosure 56 of the device of the invention according to a third embodiment comprises seven zinc layers 99a, 99b, 99c, 99d, 99e, 99f, 99g produced in the same manner as the zinc layers 85a, 85b, 85c of the device of the invention, and which are shown in FIG. 31.

The device represented in FIG. 32 comprises seven corresponding stirring blades 100a, 100b, 100c, 100d, 100e, 100f, 100g arranged in each stirring zone 99a1, 99b1, 99c1, 99d1, 99e1, 99f1, 99g1, respectively, where each zone is located above each corresponding zinc layer 99a, 99b, 99c, 99d, 99e, 99f, 99g.

The pH adjustment system in the enclosure 56 is identical to the one represented in FIG. 30, except that the pH probes 93a, 93b, 93c and the acid supply pipes 97a, 97b, 97c, respectively, are arranged in one stirring zone out of two.

The pH adjustment system at the level of the lower part of the enclosure 56 is not represented in FIG. 32, but it can be present and arranged in the same manner as on the device represented in FIG. 30.

Just as for the first embodiment and the second embodiment of the invention, the recirculation of the liquid is ensured by the pump 59, the first pipe 66, the third pipe 67, the fourth pipe 64 and the fifth pipe 63, and the introduction of the liquid to be treated, 61, in the enclosure 56 is ensured by the sixth pipe 62, the three-way valve 60 and the fifth pipe 63.

The device represented in FIG. 32 comprises a liquid outlet 103, which is independent of the system for the recirculation of the liquid, and opens into a pipe 105 through which the treated liquid 68 circulates when a two-way valve 104, which is arranged at the level of the pipe 105 is open, where the control of the two-way valve 104 is not shown in FIG. 32.

The treated liquid 68 can comprise a certain quantity of zinc in solution, originating from the presence of the zinc chips in the enclosure 56 and from the circulation of the liquid through the zinc layers 99a-99g.

However, the methods and devices of the invention are intended to purify a liquid loaded with nitrates without polluting it by other components, so that it is not harmful to the environment.

Thus, to reduce the quantity of zinc in solution that may be present in the treated solution 68, the device of the invention 55 according to a third embodiment comprises, in addition, a second treatment enclosure 106 connected to the first enclosure 56 by the pipe 105.

The second treatment enclosure 106 for treating a volume of 1 L comprises three cathodic electrodes 108a, 108b, 108c and four anodic electrodes 109a, 109b, 109c, 109d, which are arranged alternately and transversely in the enclosure 106 over the entire width of the enclosure 106, forming six electrolysis cells 110a, 110b, 110c, 110d, 110e, 110f, respectively, of the same height and distributed regularly over the entire height of the enclosure 106.

The treated liquid 68 in the first enclosure 56 circulates in the pipe 105 and penetrates into the lower part of the enclosure 107 by traversing a first liquid inlet 111, and then it circulates in the enclosure 106 from the lower part of the enclosure 106 by traversing the six electrolysis cells 110a, 110b, 110c, 110d, 110e, 110f up to the upper part of the enclosure 106 comprising a liquid outlet 112.

The circulation of the liquid through the electrolysis cells of the enclosure 107 is ensured by a recirculation pump 113.

Thus, the liquid exits from the enclosure through the outlet 112 and it circulates in a pipe 112a through a three-way valve 114, in the pipes 114a and 113a, and then it penetrates again into the enclosure 107 through a second liquid inlet 115 also arranged in the bottom part of the enclosure 107.

The liquid can thus circulate several times through the series of electrolysis cells in the enclosure 107, and the flow rate of the pump is approximately 0.5 m/s.

At the level of the upper part of the enclosure 106, a pH probe 120 is connected to an enclosure 121 that controls an injection pump 122 for sodium hydroxide that, when the probe 120 detects a drop in the pH, circulates in pipe 122 opening into the upper part of the enclosure 106.

Figure 33:
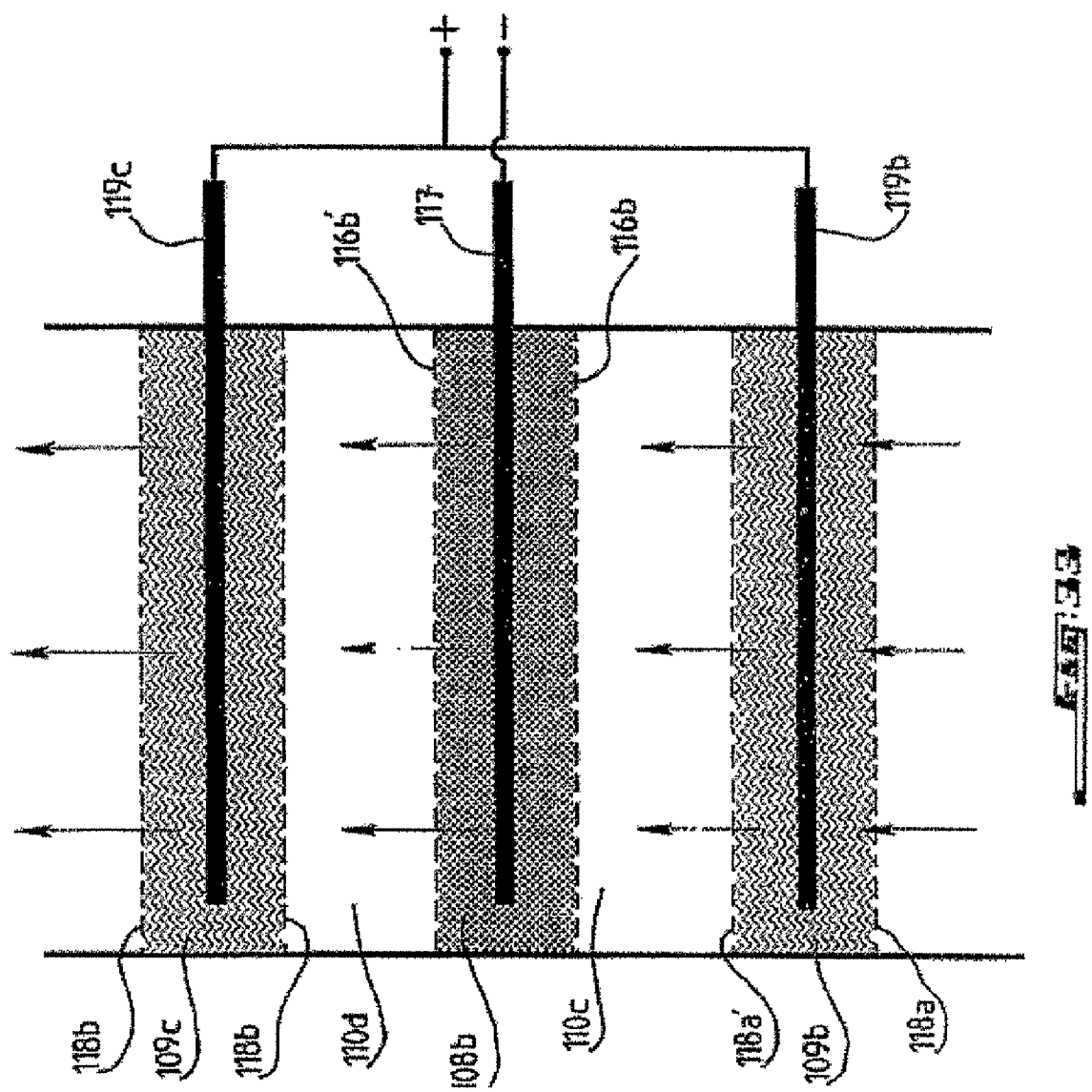
FIG. 33 is an enlargement of circled part marked XXXIII of FIG. 32.

With reference to FIG. 33, which is an enlargement of the circled part of FIG. 32 and which represents two electrolysis cells 110c, 110d, the cathodic electrode 108b is produced by the compression of carbon particles between two perforated plates 116b, 116b', in which a perforated metal plate 117 is inserted while being connected to the negative pole of a current generator, which is not shown.

The anodic electrodes 109b, 109c are produced by the compression of zinc chips between two perforated plates 118a, 118a'; 118b, 118b', respectively, and a perforated metal plate 119b, 119c is inserted in the zinc chips while being connected to the positive pole of the current generator.

The perforated plates 118a, 118a'; 118b, 118b'; 116b, 116b' are in the form of meshes making it possible to prevent the presence of carbon particles, or zinc chips in the solution.

The generator delivers a voltage of approximately 2 volts with a current intensity between 1.5 and 1.8 amperes per liter of solution.

Naturally, the structure of the anodic and cathodic electrodes described with reference to FIG. 33 applies to all the electrodes represented in FIG. 32.

Table 4 represents the results in terms of reduction of the zinc concentration in the enclosure 106 as a function of the pH of the solution circulating in the electrolysis cells 110a, 110b, 110c, 110d, 110e, 110f, of the initial zinc concentration in the liquid 68, and of the geometry of the anodic electrode.

TABLE 4

| Test No. | Zinc concentration | pH | Geometry of the anodic electrode | Geometry of the cathodic electrode | Final zinc concentration | Remarks |
|---|---|---|---|---|---|---|
| 1 | 8 g/L | 4.5-5 | plate | voluminal | — | Test stopped after 90 min (strong odor of chlorine) |
| 2 | 8 g/L | 10-10.5 | plate | voluminal | — | A large part of the Zn remains in the form of a deposit at the bottom of the enclosure |
| 3 | 1 g/L | 10-10.5 | plate | voluminal | — | After 5 h, a deposit of zinc remains at the bottom of the enclosure |
| 4 | 8 g/L | 4.5-5 | voluminal | voluminal | 3 g/L | Change in the appearance of the zinc chips |
| 5 | 8 g/L | 10-10.5 | voluminal | voluminal | 15 mg/L | Duration of the test 4 hours - no deposit of zinc at the bottom |

The cathodic electrode used in the five tests corresponds to the one described above with reference to FIGS. 32 and 33.

With regard to the geometry of the anodic electrode, the anodic electrode identified as "plate" in Table 4 consists of a simple perforated zinc plate connected to the +pole of the generator.

For tests 4 and 5, the anodic electrode used and mentioned as "voluminal" corresponds to the one described above with reference to FIGS. 32 and 33.

Test No. 1 was stopped after 90 minutes because of a strong odor of chlorine which evolved from the enclosure 106; test No. 2 did not yield a valid result because zinc was found in the form of a deposit at the bottom of the enclosure 106, and similarly for test No. 3, where, after 5 h of treatment, a deposit of zinc formed on the bottom of the enclosure 106.

In contrast, test No. 4, in which the initial zinc concentration in the liquid 68 is 8 g/L, made it possible, at a pH between 4.5 and 5 and working with the voluminal anodic and cathodic electrodes, to end up with a solution in which the zinc concentration is 3 g/L. However, it was noted during the course of this test, that the appearance of the zinc chips constituting the anodic electrode had changed.

With regard to test No. 5, for an initial zinc concentration of 8 g/L in the liquid 68, a pH between 10 and 10.5, and anodic and cathodic electrodes in conformity with those described with reference to FIG. 33, the final zinc concentration is 15 mg/L after four h.

Therefore, it is evident that it is necessary to work with anodic and cathodic electrodes in conformity with those described with reference to FIGS. 32 and 33, and that the pH of the solution which traverses the electrolysis cells 110a, 110b, 110e, 110d, 110e, 100f [sic; 110f] must preferably be greater than 7.

Thus, the device 55 of the invention allows, in the first enclosure 56, a considerable reduction in the quantity of nitrates present in the drainage waters and, in the second enclosure 106, which is connected in series to the first enclosure 56, the elimination of the residual zinc that can remain in solution in the treated solution 68, which makes it possible, highly advantageously, to obtain a solution with a concentration of nitrates and of zinc which is entirely appropriate for disposal in the environment.

As described above, the method and the device of the invention make it possible to reduce the concentration of nitrates to a value below 50 mg/L, which value corresponds to the potability threshold that was fixed in France, the potability threshold being at present fixed at 25 mg/l.

Naturally, the concentration of nitrates obtained by the method and the device of the invention being much less than 50 mg/L, the invention also applies to potability thresholds fixed at a value below 50 mg/L.

Of course, the device of the invention is not limited to the above described embodiments and particularly the device 55 can comprise a multitude of zinc layers, preferably having a limited thickness and, in the same manner, the device 106 can comprise a multitude of electrolysis cells.

Thus, the volume of the enclosure 106 can be identical to the volume of the enclosure 56, which makes it possible advantageously to completely empty the liquid contained in the enclosure 56 into the enclosure 106.

In addition, depending on the volumes of the first enclosure 56 and the second enclosure 106, the person skilled in the art will adapt an optimal circulation flow rate of the liquid for each one of these devices.

Finally, the second treatment enclosure 106, although it has been presented as reducing the quantity of zinc in the liquid 68 previously treated in the enclosure 56 for the reduction of the nitrates, can be used independently of the enclosure 56 to reduce or to eliminate, in general, the zinc that is contained in any liquid medium, which may or may not have been treated previously.

The invention claimed is:

1. A method for chemically treating a liquid medium loaded with nitrates, comprising
contacting zinc with said liquid medium, wherein the liquid medium has a pH less than 4 and the zinc is in the form of chips,
treating the liquid medium by electrolysis, and
maintaining a pH of 10 in the liquid medium during the entire electrolysis step.

2. The method according to claim 1, further comprising maintaining the pH of said liquid medium by a regular adjustment with the addition of acid to the liquid medium.

3. The method according to claim 2, wherein the acid is hydrochloric acid.

4. The method according to claim 2, wherein the pH adjustment is carried out at least every half hour throughout the treatment.

5. The method according to claim 1, wherein the liquid medium has a temperature greater than 20° C. during contacting.

6. The method according to claim 1, wherein the liquid medium has a temperature of approximately 20° C.

7. The method according to claim 1, wherein the zinc and the nitrates in solution have a weight ratio of at least 5.

8. The method according to claim 1, wherein the liquid medium is stirred.

9. The method according to claim 8, wherein the stirring is carried out by pulses or by static mixers.

10. The method according to claim 8, wherein the liquid medium is stirred at a speed of at least 0.55 m/s.

11. The method according to claim 1, wherein the liquid medium has an initial concentration of nitrates greater than 25 mg/L.

12. The method according to claim 1, wherein the liquid medium has an initial concentration of nitrates greater than 50 mg/L.

13. The method according to claim 1, wherein the zinc chips are degreased and rinsed with distilled water.

14. The method according to claim 1, wherein the zinc and the liquid medium have a surface area between them of at least 0.0156 $m^2$/L.

15. The method according to claim 14, wherein the contact surface area between the zinc and the liquid medium is approximately 0.25 $m^2$/L.

16. The method according to claim 1, wherein the liquid medium is drainage water.

17. The method according to claim 16, wherein the drainage water has a concentration of nitrates greater than 1 g/L.

18. The method according to claim 1, wherein the liquid medium in contact with the zinc has a flow rate of circulation greater than 0.005 m/s.

19. The method according to claim 18, wherein the flow rate of circulation of the liquid medium in contact with the zinc is approximately 0.01 m/s.

20. The method according to claim 1, wherein the electrolysis causes the liquid medium to circulate in at least one electrolysis cell in which a current circulates between an anodic electrode and a cathodic electrode.

21. A method for chemically treating a liquid medium loaded with nitrates, comprising
contacting zinc with said liquid medium, wherein the liquid medium has a pH less than 4 and the zinc is in the form of chips, and treating the liquid medium by electrolysis, wherein the electrolysis causes the liquid medium to circulate in at least one electrolysis cell in which a current circulates between an anodic electrode and a cathodic electrode and wherein the cathodic electrode is produced by compressing carbon particles between two perforated plates into which at least one electrode forming means is inserted while being connected to a negative pole of a generator.

22. A method for chemically treating a liquid medium loaded with nitrates, comprising contacting zinc with said liquid medium, wherein the liquid medium has a pH less than 4 and the zinc is in the form of chips, and treating the liquid medium by electrolysis, wherein the electrolysis causes the liquid medium to circulate in at least one electrolysis cell in which a current circulates between an anodic electrode and a cathodic electrode and wherein the anodic electrode is produced by compressing zinc chips between two perforated plates into which at least one electrode forming means is inserted while being connected to a positive pole of a generator.

23. The method according to claim 20, wherein the liquid medium circulates in at least six electrolysis cells.

24. The method according to claim 21, further comprising maintaining a pH of the liquid medium above 5 during the entire electrolysis step.

25. The method according to claim 20, wherein electrolysis includes applying a potential between the anodic electrode and cathodic electrode of approximately 2 volts for a current intensity between 1.5 and 1.8 amperes per L of solution treated.

26. A device for chemically treating a liquid medium loaded with nitrates and with a pH less than 4, comprising at least one liquid nitrate reduction enclosure, which comprises a liquid inlet, at least one zinc layer, wherein the zinc is in the form of chips, a means for the circulation of said liquid medium, through said zinc layer, a liquid medium outlet of the enclosure, and at least one pH regulator, capable of maintaining the liquid medium at a pH of less than 4 wherein the nitrate reduction enclosure is arranged vertically and comprises at least one zinc layer transversely arranged over an entire width of the enclosure and produced by compression of zinc chips between two perforated plates, and the liquid inlet is arranged in a lower part of the enclosure, and the liquid outlet is arranged in an upper part of the enclosure, wherein the device further comprises a recirculation pump capable of ensuring circulation and recirculation of the liquid from the inlet to the outlet by traversing all the zinc layers.

27. The device according to claim 26, wherein each zinc layer has a height less than 10 cm.

28. The device according to claim 26, wherein the enclosure comprises a system for stirring the liquid capable of stirring the liquid circulating in the enclosure above each zinc layer by forming a corresponding stirring zone.

29. The device according to claim 28, wherein the liquid in each stirring zone has a stirring speed of 0.85 m/s.

30. The device according to claim 28, wherein at least one stirring zone is connected to a pH regulator.

31. A device for chemically treating a liquid medium loaded with nitrates and with a pH less than 4, comprising at least one liquid nitrate reduction enclosure, which comprises a liquid inlet, at least one zinc layer, wherein the zinc is in the form of chips, a means for the circulation of said liquid medium, through said zinc layer, and a liquid medium outlet of the enclosure, wherein the enclosure comprises a system for stirring the liquid capable of stirring the liquid circulating in the enclosure above each zinc layer by forming a corresponding stirring zone, wherein at least one stirring zone is connected to a pH regulator, and wherein the pH regulator further comprises at least one probe that measures the pH in the corresponding stirring zone, a control enclosure and an acid circulation pump.

32. The device according to claim 31, wherein the pH regulator maintains a pH between 2 and 3 the corresponding stirring zone between 2 and 3.

33. The device according to claim 26, wherein the liquid in the enclosure has a circulation speed of approximately 0.01 m/s.

34. The device according to claim 26, wherein the enclosure comprises at least three zinc layers.

35. The device according to claim 26, further comprising a zinc reduction enclosure in which the liquid circulates at the outlet of the nitrate reduction enclosure.

36. The device according to claim 35, wherein the zinc reduction enclosure comprises at least one electrolysis cell.

37. A device for chemically treating a liquid medium loaded with nitrates and with a pH less than 4, comprising at least one liquid nitrate reduction enclosure, which comprises a liquid inlet, at least one zinc layer, wherein the zinc is in the form of chips, a means for the circulation of said liquid medium, through said zinc layer, a liquid medium outlet of the enclosure, and a zinc reduction enclosure in which the liquid circulates at the outlet of the nitrate reduction enclosure, wherein the zinc reduction enclosure comprises at least one electrolysis cell and wherein each cathodic electrode of the respective electrolysis cells is produced by compression of carbon particles between two perforated plates and at least one electrode forming means is inserted into the carbon particles and connected to a negative pole of a current generator.

38. A device for chemically treating a liquid medium loaded with nitrates and with a pH less than 4, comprising at least one liquid nitrate reduction enclosure, which comprises a liquid inlet, at least one zinc layer, wherein the zinc is in the form of chips, a means for the circulation of said liquid medium, through said zinc layer, a liquid medium outlet of the enclosure, and a zinc reduction enclosure in which the liquid circulates at the outlet of the nitrate reduction enclosure, wherein the zinc reduction enclosure comprises at least one electrolysis cell and wherein each anodic electrode of the respective electrolysis cells is produced by compression of zinc chips between two perforated plates and at least one electrode forming means is inserted into the zinc chips and connected to a positive pole of a current generator.

39. The device according to claim 36, wherein the zinc reduction enclosure comprises at least three electrolysis cells.

40. The device according to claim 38, wherein the zinc reduction enclosure is vertical and anodic electrodes and cathodic electrodes, which form the corresponding electrolysis cells, are arranged transversely over an entire width of the enclosure, so that all the liquid circulating in the enclosure traverses the electrolysis cells, in that the liquid inlet is arranged in a lower part of the of the enclosure, in that the liquid outlet is arranged in an upper part of the enclosure, and in that the device of the invention further comprises a recirculation pump capable of ensuring circulation and recirculation of the liquid from the inlet up to the outlet by traversing all the electrolysis cells.

41. The device according to claim 35, further comprising a pH regulator that maintains the liquid medium circulating in the zinc reduction enclosure at a pH above 7.

* * * * *